United States Patent
Beaufays et al.

(10) Patent No.: US 12,183,321 B2
(45) Date of Patent: *Dec. 31, 2024

(54) USING CORRECTIONS, OF PREDICTED TEXTUAL SEGMENTS OF SPOKEN UTTERANCES, FOR TRAINING OF ON-DEVICE SPEECH RECOGNITION MODEL

(71) Applicant: GOOGLE LLC, Mountain View, CA (US)

(72) Inventors: Françoise Beaufays, Mountain View, CA (US); Johan Schalkwyk, Scarsdale, NY (US); Giovanni Motta, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,122

(22) Filed: Oct. 5, 2023

(65) Prior Publication Data
US 2024/0029711 A1    Jan. 25, 2024

Related U.S. Application Data

(63) Continuation of application No. 17/250,165, filed as application No. PCT/US2019/055901 on Oct. 11, 2019, now Pat. No. 11,817,080.
(Continued)

(51) Int. Cl.
*G10L 15/00* (2013.01)
*G06F 3/04842* (2022.01)
(Continued)

(52) U.S. Cl.
CPC .......... *G10L 15/00* (2013.01); *G06F 3/04842* (2013.01); *G06F 3/04883* (2013.01); *G10L 25/51* (2013.01)

(58) Field of Classification Search
CPC ..... G10L 15/00; G10L 25/51; G06F 3/04842; G06F 3/04883
See application file for complete search history.

(56) References Cited

U.S. PATENT DOCUMENTS 6,330,532 B1 * 12/2001 Manjunath ............ G10L 19/002
                                                     704/E19.041
9,703,892 B2 * 7/2017 Ramer .................. G06F 3/0236
(Continued)

FOREIGN PATENT DOCUMENTS

WO         2018184214         10/2018

OTHER PUBLICATIONS

European Patent Office; Communication pursuant to Article 94(3) EPC issued in Application No. 19795421.7; 5 pages; dated May 2, 2023.

(Continued)

*Primary Examiner* — Richemond Dorvil
*Assistant Examiner* — Ethan Daniel Kim
(74) *Attorney, Agent, or Firm* — Gray Ice Higdon

(57) ABSTRACT

Processor(s) of a client device can: receive audio data that captures a spoken utterance of a user of the client device; process, using an on-device speech recognition model, the audio data to generate a predicted textual segment that is a prediction of the spoken utterance; cause at least part of the predicted textual segment to be rendered (e.g., visually and/or audibly); receive further user interface input that is a correction of the predicted textual segment to an alternate textual segment; and generate a gradient based on comparing at least part of the predicted output to ground truth output that corresponds to the alternate textual segment. The gradient is used, by processor(s) of the client device, to update weights of the on-device speech recognition model and/or is (Continued)

transmitted to a remote system for use in remote updating of global weights of a global speech recognition model.

20 Claims, 9 Drawing Sheets

Related U.S. Application Data

(60) Provisional application No. 62/895,236, filed on Sep. 3, 2019.

(51) Int. Cl.
*G06F 3/04883* (2022.01)
*G10L 25/51* (2013.01)

(56) References Cited

U.S. PATENT DOCUMENTS

| | | | |
|---|---|---|---|
| 10,325,596 B1* | 6/2019 | Tran | G10L 15/1822 |
| 10,335,572 B1* | 7/2019 | Kumar | G06F 3/015 |
| 10,388,272 B1* | 8/2019 | Thomson | G10L 15/22 |
| 2012/0109652 A1* | 5/2012 | Levit | G10L 15/01 |
| | | | 704/E15.001 |
| 2012/0150532 A1* | 6/2012 | Mirowski | G06F 40/40 |
| | | | 704/E11.001 |
| 2012/0277893 A1* | 11/2012 | Davis | H04N 21/00 |
| | | | 700/94 |
| 2013/0080164 A1 | 3/2013 | Zanolin et al. | |
| 2015/0127346 A1 | 5/2015 | Gruenstein et al. | |
| 2016/0267380 A1 | 9/2016 | Gemello et al. | |
| 2017/0312614 A1* | 11/2017 | Tran | G06F 3/00 |
| 2018/0349348 A1* | 12/2018 | Adams | G06F 40/274 |
| 2019/0318731 A1* | 10/2019 | Jost | G10L 15/05 |
| 2020/0057287 A1* | 2/2020 | Tsakalakos | H01S 5/4025 |
| 2020/0380369 A1* | 12/2020 | Case | G06N 3/086 |
| 2021/0327410 A1 | 10/2021 | Beaufays | |

OTHER PUBLICATIONS

European Patent Office; International Search Report and Written Opinion of PCT Ser. No. PCT/US2019/055901; 9 pages; dated Jun. 5, 2020.

European Patent Office; Summons issued in Application No. 19795421.7; 5 pages; dated Jun. 10, 2024.

\* cited by examiner

USING CORRECTIONS, OF PREDICTED TEXTUAL SEGMENTS OF SPOKEN UTTERANCES, FOR TRAINING OF ON-DEVICE SPEECH RECOGNITION MODEL

BACKGROUND

Voice-based user interfaces are increasingly being used in the control of computers and other electronic devices. Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces perform speech recognition (e.g., using a speech-to-text model) on a spoken utterance to generate corresponding text, perform a semantic analysis of the text in an attempt to determine the meaning of the spoken utterance, and undertake one or more actions based on the determined meaning.

While speech recognition performance has continued to improve, inaccurate speech recognition can still occur for many situations. As a non-limiting example, inaccurate speech recognition can occur for new terms and/or for terms that are relatively infrequent (or non-existent) in a training corpus on which a speech recognition model is trained. In an attempt to effectively recognize new terms and/or infrequent terms, techniques have been proposed to generate additional speech recognition hypotheses that are in addition to an initial hypothesis (or initial hypotheses), and consider the additional speech recognition hypotheses as candidates for speech recognition. However, such techniques require additional post-processing, and can still fail to lead to effective recognition of many terms in many situations, such as when the initial hypothesis/hypotheses are too far off-base and/or when a lexicon for the additional hypotheses does not include certain terms.

Moreover, inaccurate speech recognition can be exacerbated when speech recognition is performed on-device (i.e., on a client device). This can be due to, for example, an on-device speech recognition model being less robust than a cloud-based model, on-device memory and/or processor resources being more constrained than cloud-based resources, and/or additional hypotheses generation lexicons being more constrained on device. However, in many circumstances it would be beneficial to perform speech recognition on-device rather than remotely in light of technical considerations that may include performance, data security and networks usage.

SUMMARY

Some implementations disclosed herein are directed to improving performance of speech recognition that is performed locally, at a client device, utilizing an on-device speech recognition model (referred to herein as "on-device speech recognition"). In those implementations, processor(s) of a client device: receive audio data that captures a spoken utterance of a user of the client device; process, using an on-device speech recognition model, the audio data to generate a predicted textual segment that is a prediction of the spoken utterance; cause at least part of the predicted textual segment to be visually rendered at a display of the client device; receive further user interface input that is a correction of the predicted textual segment to an alternate textual segment; and generate a gradient based on comparing at least part of the predicted output to ground truth output that corresponds to the alternate textual segment. For example, the on-device speech recognition model can be an end-to-end speech recognition model that is used to generate predicted output of a predicted textual segment, and generating the gradient can be based on comparing at least part of the predicted output used to generate the predicted textual segment to ground truth output that corresponds to the alternate textual segment. Also, for example, the on-device speech recognition model can instead be used to generate predicted output of a sequence of predicted phonemes that corresponds to the predicted textual segment, and generating the gradient can be based on comparing at least part of the predicted output used to generate the sequence of predicted phonemes to a ground truth sequence of phonemes that corresponds to the alternate textual segment. As yet another example, the on-device speech recognition model can be the end-to-end speech recognition model that is used to generate predicted output of a predicted textual segment, and generating the gradient can be based on comparing the portion of the predicted textual segment that was corrected, to ground truth output that corresponds to the portion of the alternate textual segment that constitutes the correction.

In some implementations, the generated gradient is used, by one or more processor(s) of the client device, to update one or more weights of the on-device speech recognition model based on the generated gradient. For example, back-propagation and/or other technique(s) can be used to update the weights based on the generated gradient. This can improve speech recognition performance, at the client device using the on-device speech recognition model, for spoken utterances that include the alternate textual segment. Moreover, this enables the on-device speech recognition model to be trained based on actual human utterances, of a particular user, and adapted to: speech characteristics of the particular user (e.g., tone, intonation, accent, and/or other speech characteristic(s)); particular textual segments that are unique to the particular user; and/or particular textual segments that occur frequently for the particular user. This can result in improved on-device speech recognition performance that is tailored to those speech characteristic(s) and/or to particular textual segments that are more likely to be encountered in spoken utterances processed at the client device.

As one example of updating an on-device speech recognition model based on a generated gradient, audio data corresponding to a spoken utterance can be detected via one or more microphones of the client device. Further, a predicted textual segment corresponding to the spoken utterance can be generated based on predicted output that is generated by processing the audio data using an on-device speech recognition model. Yet further, received user input can correct the predicted textual segment to an alternate textual segment. A gradient can be generated based on comparing at least part of the predicted output to a ground truth output that corresponds to at least part of the alternate textual segment. One or more weights of the on-device speech recognition model can be updated based on the generated gradient.

In some implementations, the on-device speech recognition model that is updated based on the generated gradient can be in addition to an on-device speech recognition model that is currently being utilized, by the client device, in performing speech recognition of spoken utterances detected at the client device. In those implementations, the on-device speech recognition model that is updated can, in response to one or more conditions being satisfied, be deployed to effectively replace the on-device speech recognition model that is currently being utilized (thereby becoming the on-device speech recognition model that is currently being utilized). For example, the condition(s) can include: on-device validation of the on-device speech recognition model that is updated; on-device determination that the on-device speech recognition model that is updated performs better (e.g., with respect to precision and/or recall) than the on-device speech recognition model currently being utilized; and/or occurrence of at least a threshold quantity and/or duration of training of the on-device speech recognition model that is updated. Determining that the on-device speech recognition model that is updated performs better than the on-device speech recognition model currently being utilized can be based on, for example, comparing performances based on training instance(s) that are generated according to techniques described herein, but that have not been utilized in training (i.e., instead held back for testing). Deploying a currently utilized on-device speech recognition model to effectively replace an updated on-device speech recognition model can include updating weights of the currently utilized model with weights of the updated model, or replacing the currently utilized model with the updated model. Once an updated model effectively replaces a currently utilized model and is used for speech recognition, a copy of the updated model can then be used as the new model to be updated.

In some implementations, the generated gradient is additionally or alternatively transmitted, by the client device and over a network, to a remote system. In those implementations, the remote system utilizes the generated gradient, and additional gradients from additional client devices, to update global weights of a global speech recognition model. The additional gradients from the additional client devices can be similarly generated, locally at the corresponding additional client devices, based on corrections of predicted textual segments to alternate textual segments. In various implementations, the client device transmits the generated gradient without transmitting any of: the predicted textual segment, the audio data, and the alternate textual segment. The remote system can utilize the generated gradient in updating the global model, without any reference to or use of the predicted textual segment, the audio data, and the alternate textual segment. The transmitting of only the gradient utilizes less network resources than transmitting of the larger data size combination of the predicted textual segment, the audio data, and the alternate textual segment. Further, transmitting of the gradient preserves privacy and security of personal data, as the predicted textual segment, the audio data, and the alternate textual segment are not derivable from the gradient. In some implementations, one or more differential privacy techniques (e.g., adding Gaussian noise) can be utilized to further ensure the predicted textual segment, the audio data, and/or the alternate textual segment are not derivable from the gradient.

In implementations where the remote system updates global weights of the speech recognition model, the remote system can thereafter provide the updated global weights to client devices to cause the client devices to replace weights of their on-device speech recognition models with the updated global weights. In some implementations, the remote system can additionally or alternatively provide the updated global speech recognition model to client devices to cause the client devices to replace their on-device speech recognition models with the updated global speech recognition model. On-device speech recognition performance is therefore improved through utilization of the updated global weights or updated global speech recognition model.

Various techniques can be utilized by a client device to identify a correction of a predicted textual segment to an alternate textual segment for utilization in generating gradients to update one or more weights for an on-device speech recognition model. These techniques can include user input that modifies and/or replaces term(s) of a predicted textual segment, to thereby generate an alternate textual segment that is utilized in generating a gradient. For example, the gradient can be generated based on comparing ground truth output, that corresponds to the alternate textual segment, to the predicted output used to generate the predicted textual segment. These techniques can additionally or alternatively include determining multiple candidate predicted textual segments based on processing a spoken utterance, presenting the user with multiple candidate textual segments, and utilizing, as the alternate textual segment in generating the gradient, the candidate textual segment that is selected by the user in response to the presentation. For example, the gradient can be generated based on comparing ground truth output, that corresponds to the alternate textual segment, to the predicted output used to generate the multiple candidate textual segments. These techniques can additionally or alternatively include determining an alternate textual segment based on a subsequent spoken utterance, when it is determined that the subsequent spoken utterance is intended as a correction to speech recognition performance of a prior (e.g., immediately preceding) spoken utterance. For example, the gradient can be generated based on comparing ground truth output, that corresponds to the alternate textual segment, to the predicted output generated based on processing the prior spoken utterance. An overview of some non-limiting examples of these techniques is provided below.

As one example of using user input that replaces and/or modifies term(s) of a predicted textual segment, audio data, that captures a human utterance and that is detected via one or more microphones of the client device, can be processed using the on-device speech recognition model to generate a predicted output. A predicted textual segment, that is a prediction of the human utterance, can be determined based on the predicted output. At least part of (e.g., all of, or only certain term(s) of) the predicted textual segment can be rendered (e.g., visually and/or audibly) at the client device. One or more of the rendered terms of the predicted textual segment can be modified and/or replaced by received user input (e.g., typed or spoken), thereby resulting in a correction of the predicted textual segment to an alternate textual segment (where predicted term(s) are replaced by the alternate term(s) indicated by the received user input). The alternate textual segment can then be utilized in generating a gradient that is utilized to update the on-device speech recognition model and/or that is transmitted to a remote system for updating global weights of a global speech recognition model. For example, the gradient can be generated based on comparing ground truth output, that corresponds to the alternate textual segment, to the predicted output that is generated by processing the audio data and that is used in predicting the predicted textual segment.

As described in more detail herein, in some implementations an alternate textual segment, from a correction of a predicted textual segment to the alternate textual segment, will only be utilized in updating the speech recognition model if it is determined that the correction is directed to performance of the speech recognition model. In other words, those various implementations discriminate between corrections that correct an incorrect predicted textual segment, and corrections that are instead made for syntactic and/or semantic purposes. For instance, those various implementations can determine that a correction of "ecstatic" to "static" is directed to performance of the speech recognition model (and should be used in generating a gradient to update the speech recognition model), whereas a correction of "ecstatic" to "happy" is not directed to performance of the speech recognition model (it is, instead, a semantic correction). Also, for instance, those various implementations can determine that a correction of "Let's meet at Joel's for lunch" to "Let's meet at Joella's for lunch" is directed to performance of the speech recognition model, whereas a correction of "Let's meet at Joel's for lunch" to "Let's meet at Joel's tomorrow at noon for lunch" is not directed to performance of the speech recognition model.

As one particular example of using user input that replaces and/or modifies term(s) of a predicted textual segment, assume that a user speaks "Hi Françoise", and a predicted textual segment of "Hi François" (without an "e" at the end) is generated using the on-device speech recognition model. The predicted textual segment "Hi François" can be visually rendered, and user input received that modifies a term of the predicted textual segment by adding an "e" at the end of "François" (resulting in an alternate textual segment of "Hi Françoise"). A correction for the spoken utterance can be identified based on the received user input that added the "e" to the predicted textual segment of "François", and the alternate textual segment of "Hi Françoise" (or phonemes corresponding thereto) can be utilized as ground truth output in generating a gradient. As another particular example, assume the predicted textual segment of "Hi Francis" was instead generated and visually rendered, and user input received that deletes the term "Francis" and replaces it with "Françoise" (resulting in an alternate textual segment of "Hi Françoise"). The alternate textual segment of "Hi Françoise" (or phonemes corresponding thereto) can be utilized as ground truth output in generating a gradient.

While the preceding examples involve user input that modifies and/or replaces term(s) of a predicted textual segment, other implementations can additionally or alternatively identify a user correction by presenting the user with multiple candidate textual segments, and utilizing a user selected candidate textual segment as the "alternate textual segment" used in generating ground truth output. For example, assume that multiple candidate predicted textual segments are generated based on processing a spoken utterance using an on-device speech recognition model. For instance, a primary predicted textual segment can be generated based on predicted output generated by processing the spoken utterance using the on-device speech recognition model, as well as a first alternate predicted textual segment and a second alternate predicted textual segment. One or more of the alternate predicted textual segments can be generated, for example, as additional hypotheses by replacing term(s) from the primary predicted textual segment with contextually relevant and/or similar (e.g., phonetically) term(s). One or more of the alternate predicted textual segments can additionally or alternatively be generated, for example, by selecting one or more less probable characters or phonemes, indicated by the predicted output, in lieu of more probable counterparts, thereby resulting in an alternate predicted textual segment. At least parts of two or more of the multiple candidate predicted textual segments can be rendered (e.g., visually and/or audibly), and can each be selectable to enable the user to select the correct textual segment from among the rendered candidate predicted textual segments. Optionally, the two or more candidate predicted textual segments can be rendered along with a prompt for the user to select the correct textual segment from among the rendered candidate textual segments.

In some implementations, determining to render the candidate textual segment, for selection by a user of a correct textual segment, can be based on confidence measure(s) for the primary candidate textual segment and/or the alternate candidate textual segment(s). For example, the alternate candidate textual segment(s) can be rendered along with the primary candidate textual segment based on a confidence measure for the primary candidate textual segment failing to satisfy a threshold, based on confidence measure(s) for the alternate candidate textual segment(s) being within a threshold of the confidence measure for the primary candidate textual segment, and/or based on confidence measure(s) for the alternate candidate textual segment(s) satisfying a threshold. Once rendered, the correct textual segment can be selected by a user via the client device (e.g., using touch input or spoken input). The selected correct textual segment can then be utilized in generating a gradient, by comparing a ground truth output, that corresponds to the selected correct textual segment, to the predicted output generated by processing the spoken utterance using the on-device speech recognition model.

As a particular example of rendering multiple candidate textual segments, assume a spoken utterance of "Call Ron". A primary predicted textual segment of "Call Don", and an alternate predicted textual segment of "Call Ron", can be generated based on a predicted output generated by processing the spoken utterance using an on-device speech recognition model. For example, the on-device speech recognition model can be an end-to-end model, and "Call Don" and "Call Ron" can be predicted based on an instance of predicted output, corresponding to the "R" and "D", indicating that "D" is the most probable character, but "R" is the next most probable character. A prompt of "Did you mean: (1) Call Don, or (2) Call Ron" can be rendered via a display and/or speaker(s) of a client device, and the correct textual segment "(2) Call Ron" can be selected by a user (e.g., tapping on "(2) Call Ron" or speaking "2"), thereby cancelling the incorrect textual segment (e.g., "(1) Call Don"). An alternate textual segment of "Call Ron" can be identified based on the user having selected "(2) Call Ron", and ground truth output that is based on "Call Ron" can be utilized in generating the gradient. For example, the ground truth output can include, for a corresponding instance of predicted output, a probability of "1.0" for "R" and a probability of "0.0" for "D" (and other characters). As another particular example of rendering multiple candidate textual segments, assume a spoken utterance of "Call Françoise", a primary predicted textual segment of "Call François", and alternate predicted textual segments of "Call Françoise" and "Call Francis". A prompt of "Did you mean: (1) François, (2) Françoise, or (3) Francis" can be rendered via a display and/or speaker(s) of a client device, and the correct textual segment "(2) Françoise" can be selected by a user (e.g., tapping on "(2) Françoise" or speaking "2"), thereby cancelling the incorrect textual segments (e.g., "(1) François" and "(3) Francis"). Further, an alternate textual segment of "Call Françoise" can be identified based on the selection of "(2) Françoise", and ground truth output that is based on "Call Françoise" can be utilized in generating the gradient.

While the preceding examples describe using user input that modifies and/or replaces term(s) of a predicted textual segment, or presenting the user with multiple candidate textual segments, implementations can additionally or alternatively determine a correction to a predicted textual segment of a prior utterance, based on a subsequent spoken utterance. For example, a predicted textual segment can be generated based on an initial spoken utterance, and a subsequent spoken utterance can be considered a correction to the predicted textual segment if it is determined that the subsequent spoken utterance is directed to performance of the speech recognition model. Various techniques are described herein for determining whether a subsequent spoken utterance is a correction to the predicted textual segment of a prior spoken utterance (e.g., as opposed to just a disparate spoken utterance, or a semantic and/or syntactic rephrasing of the prior spoken utterance).

When the subsequent spoken utterance is determined to be a correction of the prior spoken utterance, the alternate textual segment can be based on a primary predicted textual segment generated based on the subsequent spoken utterance (e.g., when it differs from, but is similar to, the predicted textual segment of the prior spoken utterance) or can be based on an alternate predicted textual segment generated based on the subsequent spoken utterance (e.g., one that is also an alternate of the prior spoken utterance). For example, assume the prior spoken utterance and the subsequent spoken utterance are both "call Ron" (but spoken slightly differently), and the predicted textual segment of the prior spoken utterance was "call Don". The alternate textual segment of "call Ron" can be determined based on it being the primary predicted textual segment of the subsequent spoken utterance (and optionally based on it being similar phonetically and/or similar based on edit distance), or based on it being an alternate predicted textual segment of the subsequent spoken utterance (and optionally based on it also being an alternate predicted textual segment of the prior spoken utterance). Further, a ground truth output that is based on the alternate textual segment of "call Ron" can be utilized in generating a gradient. For example, in generating the gradient the ground truth output can be compared to the predicted output, for the prior spoken utterance (for which "call Don" was incorrectly predicted), in generating the gradient.

Various techniques can be utilized to determine that a subsequent utterance is intended as a correction to a predicted textual segment of a prior utterance (i.e., that it is directed to performance of the on-device speech recognition model). In some implementations, whether a subsequent utterance is intended as a correction to a prior utterance can be based on: temporal proximity of the subsequent utterance to the prior utterance (with closer temporal proximity being more indicative of intent as a correction); similarity between the prior spoken utterance and the subsequent spoken utterance (with more similarity being more indicative of intent as a correction); whether user input (e.g., spoken input or touch input) cancelled an action to be taken based on the prior spoken utterance (with cancelling the action being more indicative of intent as a correction); and/or other factor(s), such as those described herein. In some versions of those implementations, the similarity between the spoken utterance and the additional spoken utterance can be determined based on acoustic similarity between the two utterances, edit distance or other similarity metric between predicted textual segments for the two utterances, and/or overlap between predicted candidate textual segment(s) for the two utterances.

As one example, in determining that an alternate textual segment of a subsequent utterance is a correction to a predicted textual segment of a prior utterance, temporal proximity of the utterances can be considered, as well as similarity between the two utterances. For instance, the alternate textual segment can be considered a correction if the subsequent spoken utterance is received within 0.5 seconds of the prior spoken utterance and the two utterances are determined to be similar based on comparison of acoustical features of the two utterances and/or based on comparison of textual segment prediction(s) of the two utterances. On the other hand, the alternate textual segment can be considered to not be a correction if the subsequent spoken utterance is received greater than 10.0 seconds after the prior spoken utterance, even if the two utterances are determined to be similar. For instance, in response to receiving a spoken utterance of "Call Ron", a predicted textual segment of "Call Don" can be generated, and a client device can initiate performance of an action (e.g., dialing or calling) with respect to the predicted textual segment of "Call Don". However, prior to or during performance of the action of calling a contact "Don", a subsequent spoken utterance of "Call Ron" can be received within 0.75 seconds of the prior spoken utterance. Based on determining "Call Ron" is a candidate predicted textual segment of the subsequent spoken utterance, based on determining similarity between the prior utterance and the subsequent utterance, and/or based on receiving the subsequent spoken utterance in close temporal proximity to the prior spoken utterance, a correction from the predicted textual segment of "Call Don" to the alternate textual segment "Call Ron" can be identified. As a result, the client device can initiate performance of the action (e.g., "Calling Ron") with respect to the alternate textual segment "Call Ron" as opposed to the predicted textual segment "Call Don". Moreover, a ground truth output that is based on the alternate textual segment of "Call Ron" can be utilized in generating a gradient. For example, in generating the gradient, the ground truth output can be compared to the predicted output, for the prior spoken utterance (for which "Call Don" was incorrectly predicted).

As another example, an alternate textual segment of a subsequent utterance can be determined to be a correction to a predicted textual segment of a prior utterance based on user input that cancels an action being taken (or to be taken) on the predicted textual segment, and based on determining that the two utterances are similar. For instance, assume a spoken utterance of "Call Ron", a predicted textual segment of "Call Don" is generated, and a client device initiates performance of an action (e.g., dialing or calling) with respect to the predicted textual segment of "Call Don". Prior to or during performance of the action of calling the contact "Don", a user of the client device can cancel the action by pressing a cancel user interface element and/or speaking "Cancel", "Stop", or other action cancelling command. Further, after the cancellation action the user can provide a subsequent spoken utterance of "Call Ron". Based on determining "Call Ron" is a candidate predicted textual segment of the subsequent spoken utterance, based on determining similarity between the prior utterance and the subsequent utterance, and based on receiving the subsequent spoken utterance in close temporal proximity to cancellation of the action that is based on the prior spoken utterance, a correction from the predicted textual segment of "Call Don" to the alternate textual segment "Call Ron" can be identified. As a result, the client device can initiate performance of the action (e.g., "Calling Ron") with respect to the alternate textual segment "Call Ron" as opposed to the predicted textual segment "Call Don". Further, a ground truth output that is based on the alternate textual segment of "Call Ron"

can be utilized in generating a gradient. For example, in generating the gradient, the ground truth output can be compared to the predicted output, for the prior spoken utterance (for which "Call Don" was incorrectly predicted).

In some implementations, such as when a subsequent spoken utterance repeats a portion of a prior spoken utterance, determining whether to identify a correction based on the additional spoken utterance can additionally or alternatively be based on determining a state of the user in providing the subsequent spoken utterance. The state of the user can be determined using, for example, a sentiment classifier than can process the additional spoken utterance to determine a sentiment of the user during the subsequent spoken utterance. Determining the sentiment of the user can be based on: textual features of the additional spoken utterance; acoustic features of the additional spoken utterance; a facial expression of the user detected by one or more camera(s) and/or other vision components of the client device; one or more gestures of the user detected by one or more camera(s) and/or other vision components of the client device; and/or other sentiment determinations. Determining the sentiment of the user based on textual features can include converting the additional spoken utterance to alternate predicted textual segment(s) and be based on, for example, determining term(s) of the alternate predicted textual segment(s) include particular term(s) that negate the action included in the prior spoken utterance (e.g., "Stop", "Wait", "Go back", "Cancel", etc.) and/or include particular term(s) that indicate the predicted textual segment(s) are incorrect (e.g., "No", "Not that", "Not Don"), and/or determining one or more of the term(s) of the alternate predicted textual segment(s) include particular punctuation (e.g., exclamatory term(s)). Further, determining the sentiment of the user based on acoustic features can based on, for example, detecting a particular tone that indicates a negative sentiment of the user (i.e., anger, annoyance, frustration, etc.).

For instance, the client device may initiate performance of the action "Calling Don" (associated with the predicted textual segment(s) "Call Don") in response to receiving a spoken utterance of "Call Ron", and the additional spoken utterance of "Call Ron" can be received prior to or during performance of the action "Calling Don". The sentiment classifier can process the additional spoken utterance of "Call Ron" to determine that the user was annoyed and/or frustrated when the additional spoken utterance of "Call Ron" was provided. Also for instance, the client device may initiate performance of the action "Calling Don" (associated with the predicted textual segment(s) "Call Don") in response to receiving a spoken utterance of "Call Ron", and the additional spoken utterance of "No, call Ron" can be received prior to or during performance of the action "Calling Don". The on-device speech recognition can process the additional spoken utterance to go generate alternate predicted textual segment(s) and the sentiment classifier can process term(s) of the alternate predicted textual segment(s). Further, based on the textual features of the alternate predicted textual segment(s) indicating "No, call Ron" includes the term "No", it can be inferred that the sentiment of the user is annoyed or frustrated, and that the action "Calling Don" is incorrect. Moreover, in these implementations, the predicted textual segment(s) "Call Don" can be corrected to alternate textual segment(s) "Call Ron" based on identifying "Call Don" as incorrect and/or based on "Call Ron" being a candidate predicted textual segment of the subsequent spoken utterance.

As mentioned above, in various implementations corrections of a predicted textual segment to an alternate textual segment is only utilized in generating a gradient if it is determined that the correction is directed to performance of the on-device speech recognition. Corrections directed to performance of the on-device speech recognition can be contrasted with, for example, corrections that are only syntactic and/or semantic in nature. Determining that a correction is directed to performance of the on-device speech recognition can, in some versions of those implementations, be based on determining a measure of similarity between term(s) of the predicted textual segment(s) and modified and/or replaced term(s) of the alternate textual segment(s), and based on determining the measure of similarity satisfies a threshold. In some of those versions, the measure of similarity can be determined by a similarity engine and can be based on: acoustic similarity between term(s) of the predicted textual segment(s) and corresponding modified and/or replaced term(s) of the alternate textual segment; an edit distance between term(s) of the predicted textual segment and term(s) of the alternate textual segment (e.g., a Levenshtein edit distance and/or other edit distance); whether the modified and/or replaced term(s) of the alternate textual segment were candidate term(s) for the spoken utterance on which the predicted textual segment is generated; and/or other similarity determinations.

For example, if the measure of similarity is based in part on the acoustic similarity, then phonemes of the term(s) can be compared to phonemes of the modified and/or replaced term(s), and the similarity measure can be based on comparison of the phonemes. Also, for example, if the measure of similarity is based in part on the acoustic similarity, then the term(s) and the modified and/or replaced term(s) can be converted to synthesized speech audio data using a text-to-speech (US) engine, acoustic features of the synthesized speech audio data for the respective term(s) can be compared to acoustic features of the audio data and/or alternate phonemes for the respective synthesized speech audio data can be compared to predicted phonemes, and the similarity measure can be based on comparison of the acoustic features and/or the predicted phonemes. Also, for example, if the measure of similarity is based in part on the edit, then a distance between then the alternate textual segment and the predicted textual segment can be determined (e.g., based on a number of character edits required to convert the term(s) to the modified and/or replaced term(s)).

For instance, in response to a spoken utterance of "Invite Françoise to the meeting tomorrow", predicted textual segments of "Invite François to the meeting tomorrow" can be rendered (e.g., visually and/or audibly), received user input that modifies the predicted textual segments can be user interface input that adds an "e" at the end of the name (resulting in alternate textual segments of "Invite Françoise to the meeting tomorrow"), and a correction can be identified based on the measure of similarity between "François" and "Françoise" (e.g., as indicated by one or more of the measures of similarity disclosed herein). Based on the similarity between "François" and "Françoise", it can be determined that the correction is directed to performance of the on-device speech recognition. In contrast, for instance, in response to a spoken utterance of "Invite Françoise to the meeting tomorrow", predicted textual segments of "Invite Françoise to the meeting tomorrow" can be rendered (e.g., visually and/or audibly), received user input that modifies the predicted textual segment can be user interface input that adds "1 PM" to the predicted textual segments (resulting in alternate textual segments of "Invite Françoise to the 1 PM meeting tomorrow"), but no correction is identified for the received user input that added "1 PM". This correction is not directed to on-device speech recognition because there are no term(s) of the predicted textual segment(s) that correspond to modified and/or replaced term(s) of the alternate textual segment(s). Further, in some instances, it may not be clear whether a correction is directed to performance of the on-device speech recognition model or whether a correction is a syntactic and/or semantic. In some of those instances, the correction can be disregarded as not being directed to performance of the on-device speech recognition model, to mitigate occurrences of inadvertently training the model based on syntactic or semantic corrections. In other instances, the correction can be further processed to determine whether a portion of the modified and/or replaced term(s) are directed to performance of the on-device speech recognition model and another portion of the modified and/or replaced term(s) are directed to syntactic and/or semantic corrections using the techniques disclosed herein.

To conserve limited battery, processor, memory, and/or other resources of the client device, in various implementations the client device performs one or more steps disclosed herein only responsive to determining a current state of the client device satisfies one or more conditions. For example, determining ground truth outputs based on alternate textual segments, generating gradients, and/or updating the one or more weights of an on-device speech recognition model based on generated gradients can be performed responsive to determining that the current state of the client device satisfies the one or more conditions. For instance, while a correction can be determined as it occurs, and a corresponding predicted output and alternate textual segment stored immediately in response, determining a corresponding ground truth output for the alternate textual segment, generating a corresponding gradient, and/or updating the model based on the gradient may occur only responsive to determining condition(s) are satisfied. Whether the one or more conditions are satisfied can be determined based on sensor data from one or more sensors of the client device. The one or more conditions can include, for example, that the client device is charging, that the client device has at least a threshold state of charge, that a temperature of the client device (based on one or more on-device temperature sensors) is less than a threshold, and/or that the client device is not being held by a user.

As described herein, after updating of an on-device speech recognition model according to implementations disclosed herein, the on-device speech recognition model can be utilized in processing audio data corresponding to spoken utterances, from user(s) of the corresponding device, to generate corresponding predicted textual segments. In some versions of those implementations, a gradient can be generated, on-device, based on comparing an instance of predicted output to an instance of ground truth output that is based on an alternate textual segment. In some implementations, gradient(s) generated based on these techniques can be transmitted, by the client device and over a network, to a remote system. In those implementations, the remote system utilizes the generated gradient(s), and additional gradients generated from additional client devices in a similar manner (e.g., after local updating of an on-device speech recognition model and based on comparing a predicted textual segment to a determined ground truth output that corresponds to an alternate textual segment), to update global weights of a global speech recognition model. It is noted that the updating of the global weights based on such gradients can occur along with, or independent of, updating of the global weights based on gradients that are based on locally stored textual segments and locally generated synthesized speech thereof (as described earlier). It is also noted that transmitting such gradients can occur without transmitting any of: the audio data corresponding to the spoken segment, the predicted textual segment, or the alternate textual segment. The remote system can utilize the generated gradient in updating the global model, without any reference to or use of the audio data corresponding to the spoken segment, the predicted textual segment, or the alternate textual segment. The transmitting of only the gradient utilizes less network resources, and preserves privacy and security of the on-device textual segment. In some implementations, one or more differential privacy techniques can be utilized to further ensure preservation of the privacy and security.

In some implementations, after updating of an on-device speech recognition model according to implementations disclosed herein, biasing of the on-device speech recognition based on textual segment(s) can also be utilized, when the on-device speech recognition model is processing audio data corresponding to spoken utterances to generate corresponding predicted textual segments. For example, the on-device speech recognition can be biased toward one or more textual segments stored on the device, such as contact alias(es), road name(s), media name(s), and/or other textual segment(s). The textual segment(s) to which on-device speech recognition is biased can be the same across multiple iterations of speech recognition and/or can vary amongst iterations. For example, biasing toward a first textual segments can occur in first device context(s) (e.g., context(s) based on which application(s) are executing or in the foreground, based on time of day, based on day of week, etc.) and biasing toward disparate second textual segments can occur in second device context(s). Biasing the on-device speech recognition to textual segment(s) can include, for example, injecting the textual segment(s) into the speech recognition by boosting the probability of the textual segment(s) during decoding. Biasing the on-device speech recognition based on textual segment(s) after updating of the on-device speech recognition model according to implementations disclosed herein can be more effective than biasing without such updating. This can be due to, for example, the on-device speech recognition model having been trained on sound sequences from the textual segment(s) as a result of having been updated based on corrections of predicted textual segment(s) to alternate textual segment(s).

Some implementations of client devices disclosed herein include an automated assistant application that generates the on-device speech recognitions and/or that utilizes generated on-device speech recognitions. The automated assistant application can be installed "on-top of" an operating system of the client device and/or can itself form part of (or the entirety of) the operating system of the client device. The automated assistant application includes, and/or has access to, the on-device speech recognition as well as optionally on-device natural language understanding and/or on-device fulfillment. On-device natural language understanding (NLU) can be performed using an on-device NLU module that processes recognized text, generated using the on-device speech recognition, and optionally contextual data, to generate NLU data. NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s)

to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

The above description is provided as an overview of some implementations of the present disclosure. Further description of those implementations, and other implementations, are described in more detail below.

Some implementations disclosed herein include one or more computing devices that include one or more processors such as central processing unit(s) (CPU(s)), graphics processing unit(s) (GPU(s)), digital signal processor(s) (DSP(s)), and/or tensor processing unit(s) (TPU(s)). One or more of the processors are operable to execute instructions stored in associated memory, and the instructions are configured to cause performance of any of the methods described herein. The computing devices can include, for example, client assistant devices with microphone(s), at least one display, and/or other sensor component(s). Some implementations also include one or more non-transitory computer readable storage media storing computer instructions executable by one or more processors to perform any of the methods described herein.

DETAILED DESCRIPTION

Figure 1A:
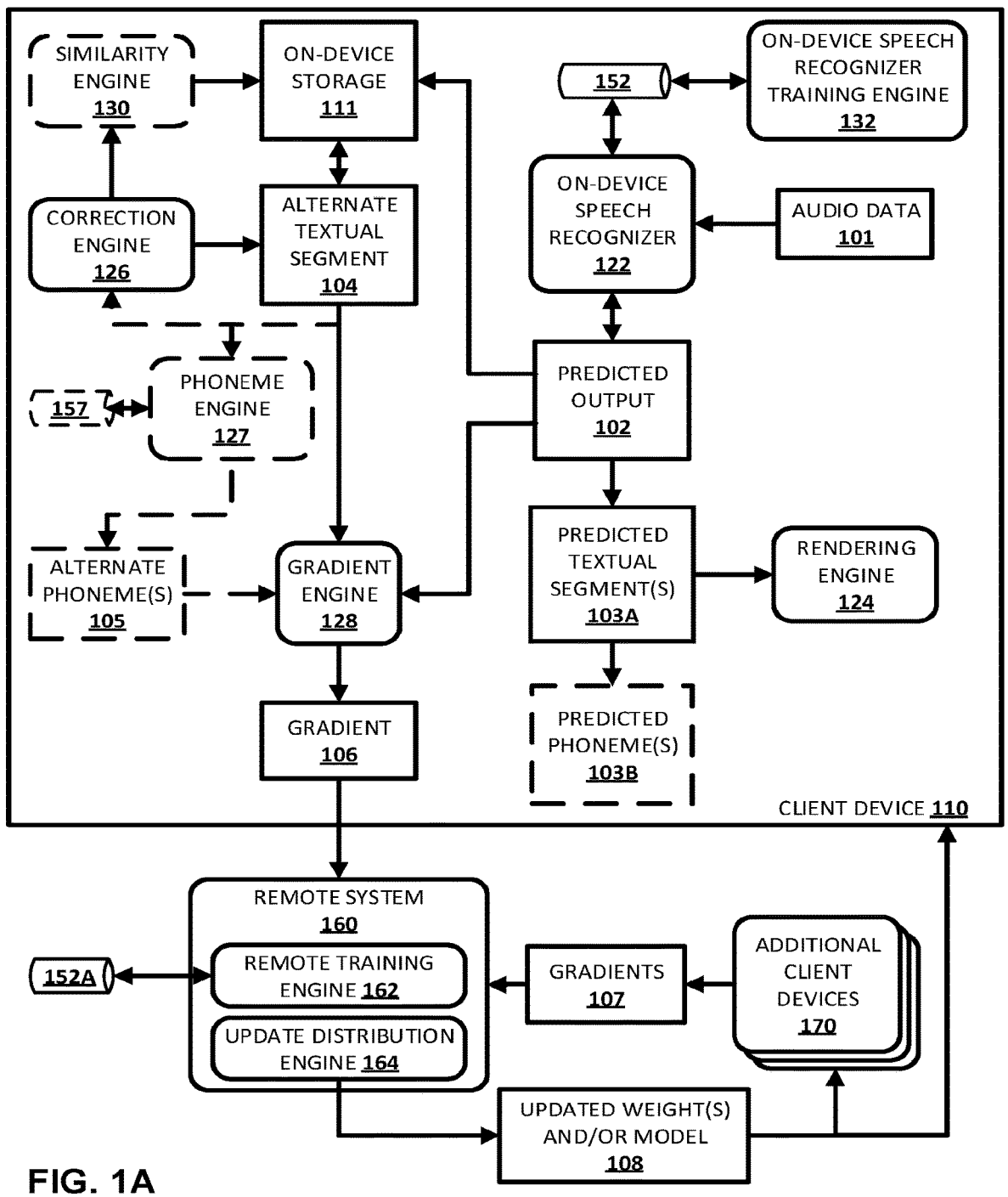
FIG. 1A depicts an example process flow that demonstrates various aspects of the present disclosure, in accordance with various implementations.

FIG. 1A illustrates an example process flow that demonstrates various aspects of the present disclosure. A client device 110 is illustrated in FIG. 1A, and includes the components that are encompassed within the box of FIG. 1A that represents client device 110. On-device speech recognizer 122 can receive audio data 101 corresponding to a spoken utterance detected via one or more microphones of the client device 110. The on-device speech recognizer 122 processes the audio data 101, using an on-device speech recognition model 152, to generate a predicted output 102. Further, based on the predicted output 102 from the on-device speech recognizer 122, predicted textual segment(s) 103A and/or predicted phoneme(s) 103B can be generated.

For example, when the on-device speech recognition model 152 is an end-to-end speech recognition model, the on-device speech recognizer 122 can generate the predicted textual segment(s) 103A directly using the model. For instance, the on-device speech recognition model 152 can be an end-to-end model used to generate predicted textual segment(s) 103A on a character-by-character basis (or other token-by-token basis). One non-limiting example of such an end-to-end model used to generate predicted textual segment(s) 103A on a character-by-character basis is a recurrent neural network transducer (RNN-T) model. An RNN-T model is a form of sequence-to-sequence model that does not employ attention mechanisms. Unlike most sequence-to-sequence models, which typically need to process the entire input sequence (e.g., an audio data waveform, or mel-frequency cepstral coefficients (MFCCs) or other representation) to produce the predicted output 102 (e.g., the predicted textual segment 103A), an RNN-T model can be used to continuously process input samples and stream output symbols (e.g., characters of the alphabet).

Also, for example, when the on-device speech recognition model 152 is not an end-to-end speech recognition model, the on-device speech recognizer 122 can instead generate the predicted phoneme(s) 103B (and/or other representations). For instance, with such models the predicted phoneme(s) 103B (and/or other representations) are then utilized by the on-device speech recognizer 122 to determine the predicted textual segment(s) 103A that conform to the predicted phoneme(s) 103B. In doing so, the on-device speech recognizer 122 can optionally employ a decoding graph, a lexicon, and/or other resource(s).

When the on-device speech recognizer 122 generates the predicted textual segment(s) 103A and/or the predicted phoneme(s) 103B, they can be stored in on-device storage 111 in association with the predicted output 102 and retrieved by gradient engine 128 at a later time. The on-device storage 111 can include, for example, random-access memory (RAM) and/or other types of volatile memory. In some implementations, the predicted textual segment(s)

103A and/or the predicted phoneme(s) 103B can also be stored, locally in on-device storage 111, in association with the audio data 101 corresponding to the spoken utterance. Further, in some additional or alternative implementations, the predicted output 102 can be provided to gradient engine 128 in real-time.

Figure 1B:
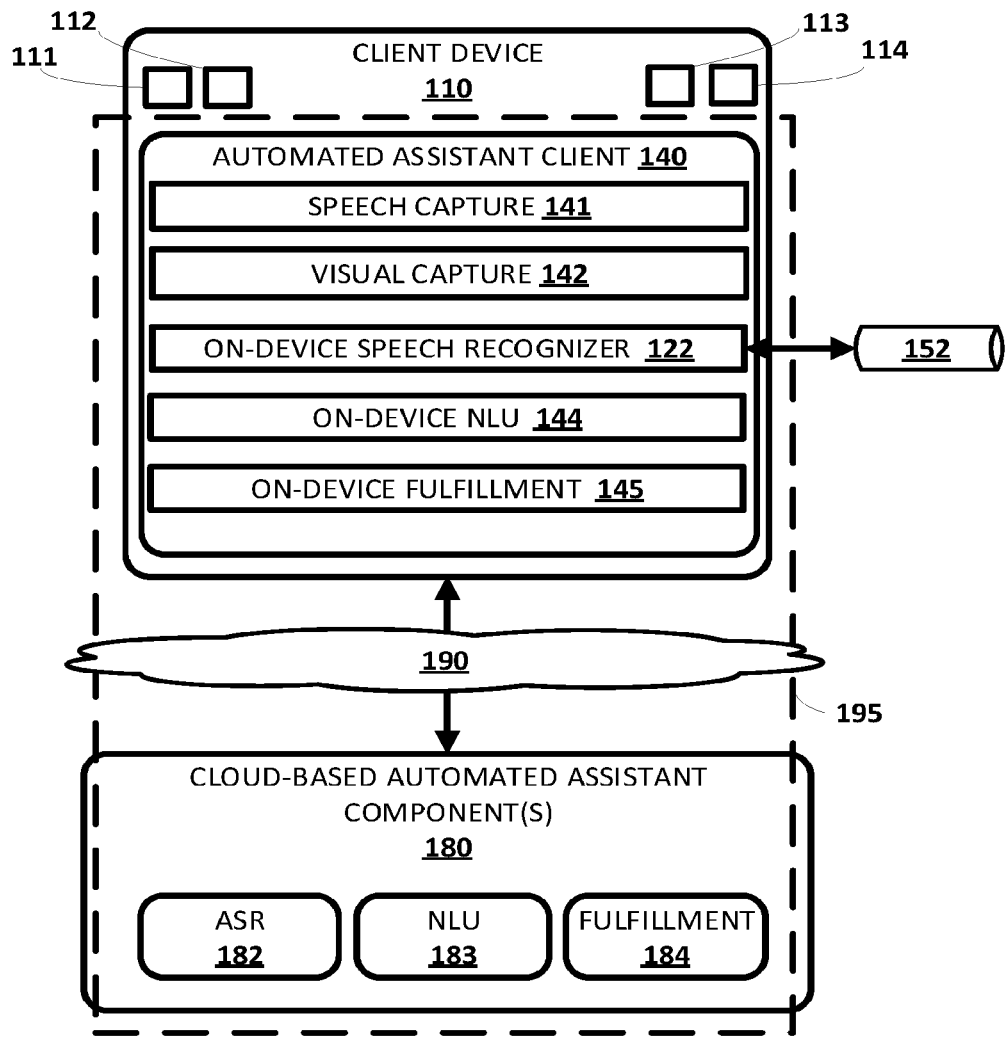
FIG. 1B depicts a block diagram of an example environment that includes various components from FIG. 1A, and in which implementations disclosed herein may be implemented.

Moreover, rendering engine 124 can render (e.g., visually and/or audibly) (e.g., via speaker(s) 112 and/or display(s) 114 of FIG. 1B) the predicted textual segment(s) 103A generated using the predicted output 102. Further, user input (either typed or spoken) can be received at the user device and processed by correction engine 126 to identify whether the user input corrects the predicted textual segment(s) 103A to an alternate textual segment 104 that corresponds to a ground truth output for the spoken utterance. Various techniques for identifying corrections of the predicted textual segment(s) 103A to the alternate textual segment 104 are described herein. As some non-limiting examples, the correction engine 126 can identify corrections based on: user input modifying and/or replacing character(s) and/or term(s) of predicted textual segment(s); user input selecting, from among multiple candidate predicted textual segments, an alternate candidate textual segment over a primary candidate textual segment; user input cancelling an action being performed based on a predicted textual segment in response to the spoken utterance; user input affirming an action to be performed based on a predicted textual segment in response to the spoken utterance; user input that is an additional spoken utterance repeating at least a portion of a prior spoken utterance; user input that indicates a particular state of the user; and/or other corrective actions.

As noted above, identifying a correction of the predicted textual segment(s) 103A to the alternate textual segment 104 can, in some implementations, be based on user input that indicates a particular state of the user. Accordingly, in those implementations, the correction engine 126 can further include a sentiment classifier to determine a state of the user that provided the spoken utterance and the user input, and the sentiment classifier can process the user input to determine a sentiment of the user. Determining the sentiment of the user can be based on: textual features of the additional spoken utterance; acoustic features of the additional spoken utterance; a facial expression of the user detected by one or more camera(s) and/or other vision components of the client device; one or more gestures of the user detected by one or more camera(s) and/or other vision components of the client device; and/or other sentiment determinations. Determining the sentiment of the user based on textual features can include converting the additional spoken utterance to alternate predicted textual segment(s) and be based on, for example, determining term(s) of the alternate predicted textual segment(s) include particular term(s) that negate the action included in the prior spoken utterance (e.g., "Stop", "Wait", "Go back", "Cancel", etc.) and/or include particular term(s) that indicate the predicted textual segment(s) are incorrect (e.g., "No", "Not that", "Not Don"), and/or determining one or more of the term(s) of the alternate predicted textual segment(s) include particular punctuation (e.g., exclamatory term(s)). Further, determining the sentiment of the user based on acoustic features can based on, for example, detecting a particular tone that indicates a negative sentiment of the user (i.e., anger, annoyance, frustration, etc.). Moreover, in some implementations, the state of the user can be stored, locally in the on-device storage 111, in association with the audio data 101, the predicted output 102, the predicted textual segment(s) 103A, the predicted phoneme(s) 103B, and/or the alternate textual segment(s) 104.

Moreover, in some additional and/or alternative implementations, additional audio data corresponding to the user input can be, for example, in the form of an audio waveform, which can be processed to determine alternate phoneme(s) 105 for the user input. In determining the alternate phoneme(s) 105 that corresponds to the user input, the corrective action engine 126 can communicate with optional phoneme engine 127 to access a tokens-to-phonemes mapping, such as optional token-to-phonemes mapping 157, and generate the alternate phoneme(s) 105 based on the token-to-phonemes mapping 157. In some implementations, the predicted textual segment(s) 103A and/or the predicted phoneme(s) 103B can be stored, locally in on-device storage 111, in association with the audio data 101 corresponding to the spoken utterance, the additional audio data corresponding to the user input, the predicted output 102, the predicted textual segment(s) 103A, the predicted phoneme(s) 103B, the alternate textual segment(s) 104, and/or the state of the user. Further, in some additional or alternative implementations, the alternate phoneme(s) 105 can be provided to gradient engine 128 in real-time.

In some implementations, the alternate textual segment 104 will only be utilized in updating the speech recognition model 152 if it is determined that the correction is directed to performance of the speech recognition model 152. In other words, those various implementations discriminate between corrections that correct an incorrect predicted textual segment, and corrections that are instead made for syntactic and/or semantic purposes. Whether a correction from the predicted textual segment(s) 103 to the alternate textual segment 104 is directed to performance of the on-device speech recognition 152 can be based on a type of user input.

In some implementations, user input received at the correction engine 126 to correct the predicted textual segment(s) 103A to the alternate textual segment 104 can be typed or touch input. When the user input is typed or touch input, determining whether a correction is directed to performance of the on-device speech recognition model 152 can be based on: similarity, determined using optional similarity engine 130, between the predicted textual segment(s) 103A and the alternate textual segment 104 (with more similarity being more indicative of intent as a correction); whether the user input cancelled an action to be taken based on the predicted textual segment(s) 103A prior to providing further user input (with cancelling the action being more indicative of intent as a correction); and/or other factor(s). In some versions of those implementations, the similarity, determined using optional similarity engine 130, between the spoken utterance and the additional spoken utterance can be determined based on textual similarity between the predicted textual segment(s) 103A to the alternate textual segment 104, and/or edit distance or other similarity metric between the predicted textual segment(s) 103A to the alternate textual segment 104.

In some other implementations, user input received at the correction engine 126 to correct the predicted textual segment(s) 103A to the alternate textual segment 104 can be spoken input. When the user input is an additional spoken utterance, determining whether a correction is directed to performance of the on-device speech recognition model 152 can be based on: temporal proximity of the additional spoken utterance to the prior spoken utterance (with closer temporal proximity being more indicative of intent as a correction); similarity, determined using optional similarity engine 130, between the additional spoken utterance and the prior spoken utterance (with more similarity being more indicative of intent as a correction); whether the additional spoken utterance cancelled an action to be taken based on the prior spoken utterance (with cancelling the action being more indicative of intent as a correction); and/or other factor(s). In some versions of those implementations, the similarity, determined using optional similarity engine 130, between the spoken utterance and the additional spoken utterance can be determined based on acoustic similarity between the two utterances, edit distance or other similarity metric between predicted textual segments for the two utterances, and/or overlap between predicted candidate textual segment(s) for the two utterances.

When the correction engine 126 identifies a correction of the predicted textual segment(s) 103A to the alternate textual segment 104 and optionally determines the correction is directed to performance of the on-device speech recognition model 152, the alternate textual segment 104 can be stored in on-device storage 111 and/or provided to gradient engine 128 for use as ground truth output in generating gradient 106. In some implementations, the alternate textual segment(s) 104 can be stored, locally in on-device storage 111, in association with the corresponding predicted output 102, predicted textual segment(s) 103A, predicted phoneme(s) 103B, and/or audio data 101. In some implementations, the predicted output 102 and the alternate textual segment 104 are provided to the gradient engine 128 after a correction is identified in real-time and/or transmitted to remote system 160 in real-time. Further, in some versions of these implementations, the gradient 106 can be provided to on-device speech recognizer training engine 132 for updating on-device speech recognition model 152 in real-time. In other implementations, the predicted output 102 and the alternate textual segment 104 are retrieved from the on-device storage 111 and provided to the gradient engine 128 when one or more conditions are satisfied, such as one or more of the conditions described herein.

In some implementations, a gradient 106 can be generated based on the predicted output 102 used to generate the predicted textual segment(s) 103A and ground truth output that corresponds to the alternate textual segment(s) 104. For example, in versions of those implementations, in generating the gradient 106, gradient engine 128 compares the predicted output 102 used to generate the predicted textual segment(s) 103A to ground truth output that corresponds to the alternate textual segment(s) 104. The gradient may be derived from a loss function used to train the model, such that the gradient represents a value of that loss function (or a derivative thereof) obtained from comparison of the ground truth output to the predicted output. For example, if there is no correction to the predicted textual segment(s) 103A and/or the predicted textual segment(s) 103A and the alternate textual segment(s) 104 match, then the gradient engine 126 can generate a zero gradient 106. Also, for example, when the predicted textual segment(s) 103A and the alternate textual segment(s) 104 do not match, the gradient engine 128 can generate a non-zero gradient 106 that is optionally dependent on the extent of the mismatching. The extent of the mismatching can be based on an extent of mismatching between characters of the textual segments, an extent of phoneme mismatching between the textual segments, and/or based on other deterministic comparisons. As one non-limiting particular example, at each iteration of generating the predicted textual segment(s) 103A, the on-device speech recognizer 122 can generate a corresponding probability for each of a plurality of characters, and select the highest probability character as the "next" character. The gradient engine 128 can, in such an example, determine the gradient 106 based on comparing each of the predicted probabilities at each iteration to ground truth probabilities corresponding to each of the alternate textual segment(s) 104 for each iteration (i.e., where the ground truth character at each iteration is the "next" character in each of the predicted textual segment(s) 103A and is assigned a "1" probability, and all others a "0" probability).

In other implementations, a gradient 106 can be generated based on the predicted output 102 used to generate the predicted phoneme(s) 103B and ground truth output that corresponds to the alternate phoneme(s) 105. For example, in versions of those implementations, in generating the gradient 106, gradient engine 128 compares the predicted output 102 used to generate the predicted phoneme(s) 103B to ground truth output that corresponds to the alternate phoneme(s) 105. In some implementations, the phoneme engine 127 can access the tokens-to-phonemes mapping 157 to determine the alternate phoneme(s) 104 that correspond to the alternate textual segment(s) 104. As an example, when there is no correction to the predicted textual segment(s) 103A and/or when the predicted phoneme(s) 103B and the alternate phoneme(s) 105 match, the gradient engine 128 can generate a zero gradient. As another example, when the predicted phoneme(s) 103B and the alternate phoneme(s) 105 do not match, the gradient engine 128 can generate a non-zero gradient that is optionally dependent on the extent of the mismatching. The extent of the mismatching can be based on a quantity of mismatched phonemes, a quantity of incorrectly ordered phonemes, and/or a distance (in phoneme space) between mismatched phoneme(s), and/or based on other deterministic comparisons.

The gradient engine 128 provides the gradient 106 to on-device speech recognizer training engine 132 and/or transmits the gradient 106 to remote system 160. The on-device speech recognizer training engine 132, when it receives the gradient 106, uses the gradient 106 to update the on-device speech recognition model 152. For example, the on-device speech recognizer training engine 132 can utilize backpropagation and/or other techniques to update the on-device speech recognition model 152. It is noted that, in some implementations, the on-device training engine 132 can utilize batch techniques to update the on-device speech recognition model 152 based on the gradient 106 and additional gradients determined locally at the client device 110 on the basis of additional textual segments.

When the remote system 160 receives the gradient 106, a remote training engine 162 of the remote system 160 uses the gradient 106, and additional gradients 107 from additional client devices 170, to update global weights of a global speech recognition model 152A. The additional gradients 107 from the additional client devices 170 can each be generated based on the same or similar technique as described above with respect to gradient 106 (but on the basis of locally identified corrections of predicted textual segment(s) to an alternate textual segment that are particular to those client devices).

An update distribution engine 164 can, responsive to one or more conditions being satisfied, provide, to client device 110 and/or other client device(s), the updated global weights and/or the updated global speech recognition model itself, as indicated by 108. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device speech recognition model 152, with the updated weights. When the updated global speech recognition model is provided to the client device 110, the client device 110 can replace the on-device speech recognition model 152 with the updated global speech recognition model.

In some implementations, the on-device speech recognizer model 152 is transmitted (e.g., by the remote system 160 or other component) for storage and use at the client device 110, based on a geographic region and/or other properties of the client device 110 and/or a user of the client device 110. For example, the on-device speech recognizer model 152 can be one of N available speech recognizer models for a given language, but can be trained based on corrections that are specific to a particular geographic region and provided to client device 110 based on client device being primarily located in the particular geographic region.

In some additional or alternative implementations, the on-device speech recognizer model 152 is trained by the optional on-device speech recognizer training engine 132 to adapt the on-device speech recognizer model 152 to voice characteristic(s) of user(s) of the client device 110. For example, prior to generating the predicted textual segment(s) 103A, the on-device speech recognizer training engine 132 can retrieve, from the on-device storage 111, audio data corresponding to a prior human utterance, prior predicted textual segment(s) for the audio data, and prior alternate textual segment(s) that corrects the prior predicted textual segment(s). Further, the on-device speech recognizer training engine 132 can identify a ground truth output for the prior human utterance based on the alternate textual segment(s). Yet further, a gradient engine 128 can generate a gradient 106 based on comparing the prior predicted textual segment(s) to the prior alternate textual segment(s). The on-device speech recognizer training engine 132 can then update weight(s) of the on-device speech recognizer model 152 based on the gradient (e.g., using backpropagation and/or other training technique(s)).

Turning now to FIG. 1B, the client device 110 is illustrated in an implementation where the on-device speech recognizer 122 of FIG. 1A is included as part of (or in communication with) an automated assistant client 140. The on-device speech recognition model 152 is also illustrated interfacing with the on-device speech recognizer 122. Other components from FIG. 1A are not illustrated in FIG. 1B for simplicity. FIG. 1B illustrates one example of how the on-device speech recognizer 122 and on-device speech recognition model 152 can be utilized in generating recognized text that is utilized by an automated assistant client 140 in performing various actions.

The client device 110 in FIG. 1B is illustrated with one or more microphones 111, one or more speakers 112, one or more camera(s) and/or other vision components 113, and display(s) 114 (e.g., a touch-sensitive display). The client device 110 at least selectively executes the automated assistant client 140. The automated assistant client 140 includes, in the example of FIG. 1B, the on-device speech recognizer engine 122, an on-device natural language understanding (NLU) engine 144, and an on-device fulfillment engine 145. The automated assistant client 140 further includes speech capture engine 141 and visual capture engine 142. The automated assistant client 140 can include additional and/or alternative engines, such as a voice activity detector (VAD), an endpoint detector, a hotword detector, and/or other engine(s).

One or more cloud-based automated assistant components 180 can optionally be implemented on one or more computing systems (collectively referred to as a "cloud" computing system) that are communicatively coupled to client device 110 via one or more local and/or wide area networks (e.g., the Internet) indicated generally at 190. The cloud-based automated assistant components 180 can be implemented, for example, via a cluster of high-performance servers.

In various implementations, an instance of an automated assistant client 140, by way of its interactions with one or more cloud-based automated assistant components 180, may form what appears to be, from a user's perspective, a logical instance of an automated assistant 195 with which the user may engage in a human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The vision component(s) 113 can take various forms, such as monographic cameras, stereographic cameras, a LIDAR component (or other laser-based component(s)), a radar component, etc. The one or more vision components 113 may be used, e.g., by visual capture engine 142, to capture vision frames (e.g., image frames, laser-based vision frames) of an environment in which client device 110 is deployed. In some implementations, such vision frame(s) can be utilized to determine whether a user is present near the client device 110 and/or a distance of the user (e.g., the user's face) relative to the client device. Such determination(s) can be utilized, for example, in determining whether to activate on-device speech recognizer 122.

Speech capture engine 141 can be configured to capture user's speech and/or other audio data captured via microphone(s) 111. As described herein, such audio data can be utilized (optionally after pre-processing) by on-device speech recognizer 122. For example, on-device speech recognizer 122 can process audio data that captures a spoken utterance, utilizing on-device speech recognition model 152, to generate recognized text that corresponds to the spoken utterance. On-device NLU engine 144 performs on-device natural language understanding on the recognized text to generate NLU data. NLU engine 144 can optionally utilize one or more on-device NLU models (not illustrated in FIG. 1B for simplicity) in generating the NLU data. NLU data can include, for example, intent(s) that correspond to the spoken utterance and optionally parameter(s) (e.g., slot values) for the intent(s). Further, on-device fulfillment engine 145 generates fulfillment data using the NLU data. On-device fulfillment engine 145 can optionally utilize one or more on-device fulfillment models (not illustrated in FIG. 1B for simplicity) in generating the fulfillment data. This fulfillment data can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 114 can be utilized to visually render streaming predicted textual segments that are generated based on predicted output from the on-device speech recognizer 122. Display(s) 114 can further be one of the user interface output component(s) through which visual portion(s) of a response, from automated assistant client 140, is rendered.

In some implementations, cloud-based automated assistant component(s) 180 can include a remote ASR engine 182 that performs speech recognition, a remote NLU engine 183 that performs natural language understanding, and/or a remote fulfillment engine 184 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 180 can be utilized at least selectively. For example, such component(s) can be utilized in parallel with on-device component(s) and output from such component(s) utilized when local component(s) fail. For example, on-device fulfillment engine 145 can fail in certain situations (e.g., due to relatively limited resources of client device 160) and remote fulfillment engine 184 can utilize the more robust resources of the cloud to generate fulfillment data in such situations. Remote fulfillment engine 184 can be operated in parallel with on-device fulfillment engine 145 and its results utilized when on-device fulfillment fails, or can be invoked responsive to determining failure of on-device fulfillment engine 145.

In various implementations, an NLU engine (on-device and/or remote) can generate annotated output that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 195. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 2:
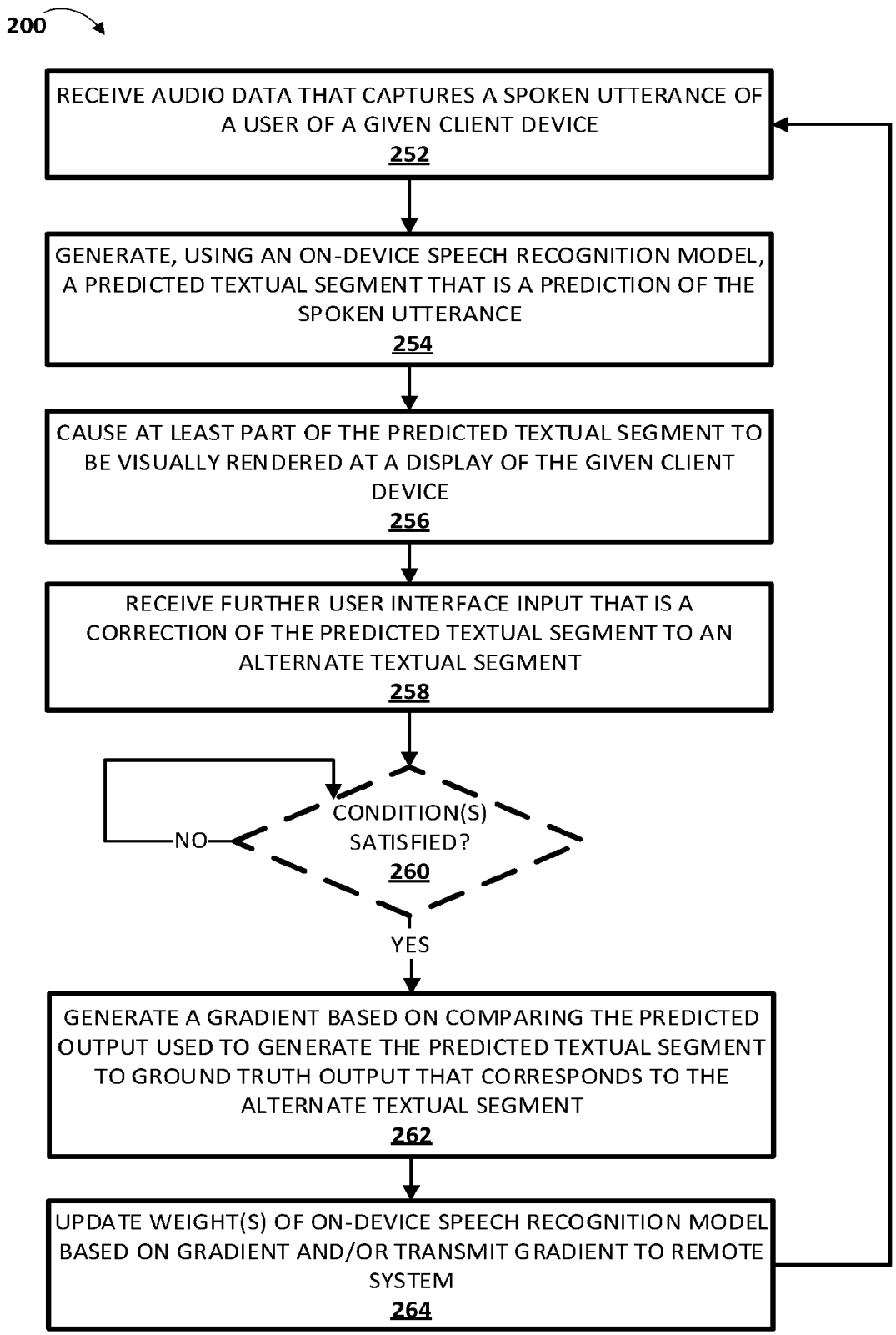
FIG. 2 depicts a flowchart illustrating an example method of generating a gradient, locally at a client device, and transmitting the gradient and/or utilizing the generated gradient to update weight(s) of an on-device speech recognition model.

FIG. 2 depicts a flowchart illustrating an example method 200 of generating a gradient, locally at a client device, and transmitting the gradient and/or utilizing the generated gradient to update weight(s) of an on-device speech recognition model. For convenience, the operations of the method 200 are described with reference to a system that performs the operations. This system of method 200 includes one or more processors and/or other component(s) of a client device. Moreover, while operations of the method 200 are shown in a particular order, this is not meant to be limiting. One or more operations may be reordered, omitted, or added.

At block 252, the system receives audio data that captures a spoken utterance of a user of a given client device.

At block 254, the system generates, using an on-device speech recognition model, a predicted textual segment that is a prediction of the spoken utterance. In some implementations, the on-device speech recognition model is an end-to-end speech recognition model and the system generates a predicted output. Based on the predicted output, candidate predicted textual segments can be generated, and the predicted textual segment can be selected, from the candidate predicted textual segments, as the prediction of the spoken utterance. Moreover, in some other implementations, the on-device speech recognition model is not an end-to-end model, and the system generates a sequence of predicted phonemes and/or another predicted representation. The predicted textual segment can be generated based on the predicted phonemes and/or the other predicted representation.

At block 256, the system causes at least part of the predicted textual segment to be visually rendered at a display of the given client device. Further, the predicted textual segment can also be audibly rendered by speakers of the client device. In some implementations, only a highest ranked predicted textual segment is visually and/or audibly rendered by the given client device. In some other implementations, multiple candidate predicted textual segments, including at least a primary predicted textual segment and at least a first alternate predicted textual segment, are visually and/or audibly rendered, and the system prompts the user of the given client device to select between at least the primary predicted textual segment and the first alternate predicted textual segment.

At block 258, the system receives further user interface input that is a correction of the predicted textual segment to an alternate textual segment. Further, the audio data, the predicted textual, and the alternate textual segment for the correction can be stored locally at the given client device. In some implementations, one or more of the rendered terms of the predicted textual segment can be modified and/or replaced by the received user input (e.g., typed or spoken), thereby resulting in a correction of the predicted textual segment to the alternate textual segment (where predicted term(s) are replaced by the alternate term(s) indicated by the received user input). In some other implementations, the user is prompted to select from among the rendered multiple candidate predicted textual segments, and the received user input (e.g., typed or spoken) selects the correct candidate predicted textual segment, thereby resulting in an alternate predicted textual segment. In yet other implementations, the received user input include input that repeats at least a portion of the spoken utterance, and based on determining that the received user input repeats at least the portion of the spoken utterance, and optionally based on determining the alternate textual segment was a candidate predicted textual segment for the prior utterance, a correction from the predicted textual segment to the alternate textual segment can be identified.

At optional block 260, the system determines whether one or more conditions are satisfied. In some implementations, optional block 260 includes determining whether a current state of the client device satisfies the one or more conditions. For example, the system can determine the current state of the client device based on sensor data from sensor(s) of the client device, and determine whether that current state of the client device satisfies the condition(s). The condition(s) can include, for example, that the client device is charging, that the client device has at least a threshold state of charge, that a temperature of the client device (based on one or more on-device temperature sensors) is less than a threshold, and/or that the client device is not being held by a user.

At block 262, the system generates a gradient based on comparing the predicted output used to generate the predicted textual segment to ground truth output that corresponds to the alternate textual segment. For example, the comparing can be based on comparing at least part of the predicted output used to generate the predicted textual segment to ground truth output that corresponds to the alternate textual segment. Also, for example, the comparing can be based on comparing the portion of the predicted textual segment that was corrected, to ground truth output that corresponds to the portion of the alternate textual segment that constitutes the correction. As yet another example, the on-device speech recognition model can instead be used to generate predicted output of a sequence of predicted phonemes that corresponds to the predicted textual segment, and generating the gradient can be based on comparing at least part of the predicted output used to generate the sequence of predicted phonemes to a ground truth sequence of phonemes that corresponds to the alternate textual segment. The gradient may represent a difference between the predicted output and the ground truth output in terms of a loss function used to train the speech recognition model or a derivative of that loss function. That is to say, where the speech recognition model is trained to minimize the magnitude of a given loss function, the gradient may be determined by comparison of the ground truth output and the predicted output in terms of that loss function.

At block 264, the system updates weight(s) of the on-device speech recognition model based on the gradient of block 262 and/or transmits (e.g., via the Internet or other wide area network) the gradient of block 262 to a remote system (without transmitting any of the textual segment, the synthesized speech audio data, and the predicted textual segment). When the gradient is transmitted to the remote system, the remote system utilizes the generated gradient, and additional gradients from additional client devices, to update global weights of a global speech recognition model. After block 264, the system then proceeds back to block 252. Updating the weights of the local or global speech recognition models may comprise applying the gradient(s) through a backpropagation process (e.g. gradient descent backpropagation) to update the weights.

It is noted that, in various implementations, multiple instances of method 200 can be performed on a given client device in parallel. It is also noted that, in some implementations, portions of method 200 can be performed at least responsive to receiving further user interface input that is a correction of the predicted textual segment(s) to the alternate textual segment(s). Further, in some versions of those implementations, corrections of the predicted textual segment(s) to the alternate textual segment(s) can be stored locally on the given client device and used to generate a gradient, for example, when the condition(s) are satisfied at optional block 260. Moreover, in some versions of those implementations, corrections of the predicted textual segment(s) to the alternate textual segment(s) can be used to generate a gradient in real-time. In these and other manners, the on-device speech recognition model can be adapted quickly and personalized to the user of the client device.

Figure 3:
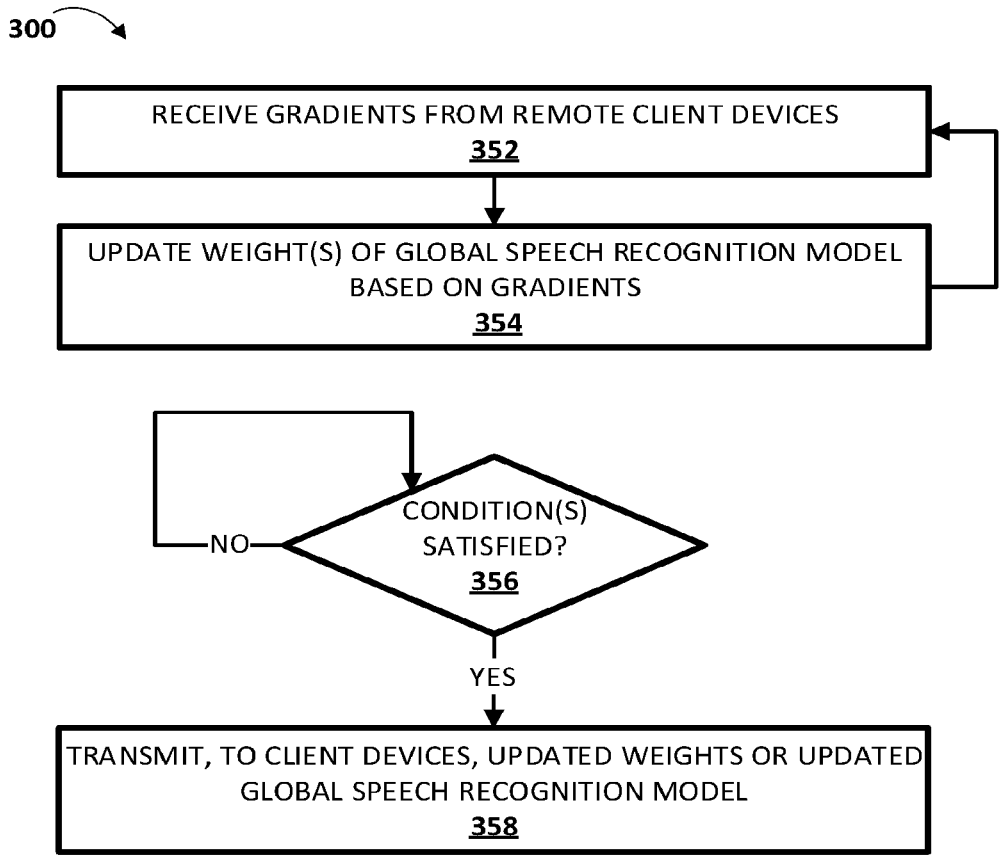
FIG. 3 depicts a flowchart illustrating an example method of updating weight(s) of a global speech recognition model based on gradients received from remote client devices, and transmitting, to remote client devices, the updated weights or the updated global speech recognition model.

FIG. 3 depicts a flowchart illustrating an example method 300 of updating weight(s) of a global speech recognition model based on gradients received from remote client devices, and transmitting, to remote client devices, the updated weights or the updated global speech recognition model. For convenience, the operations of the method 300 are described with reference to a system that performs the operations. This system may include various components of various computer systems, such as one or more server devices. Moreover, while operations of the method 300 are shown in a particular order, this is not meant to be limiting. One or more operations may be reordered, omitted, or added.

At block 352, the system receives gradients from remote client devices. For example, the system can receive gradients from a plurality of client devices that are performing corresponding instances of method 200 of FIG. 2.

At block 354, the system updates weight(s) of a global speech recognition model based on the gradients received at block 352. Iterations of blocks 352 and 354 can continue to be performed as new gradients are received and/or are queued after being received.

At block 356, the system at least periodically determines whether one or more conditions are satisfied, such as one or more of the conditions described herein. Generally, the condition(s) serve as a proxy for determining whether the global model has been updated to an extent that justifies utilization of network resources in transmitting updated weights for the model and/or the updated model itself. In other words, the condition(s) are used as proxy for determining if the performance gains of the model justify the usage of network resources. If so, the system proceeds to block 358 and transmits, to a plurality of client devices, current updated weights and/or a current updated global speech recognition model. The updated weights and/or global speech recognition model can optionally be transmitted to a given client device responsive to a request from the given client device, such as a request during an update procedure and/or a request sent due to the client device being idle and/or charging.

Figure 4:
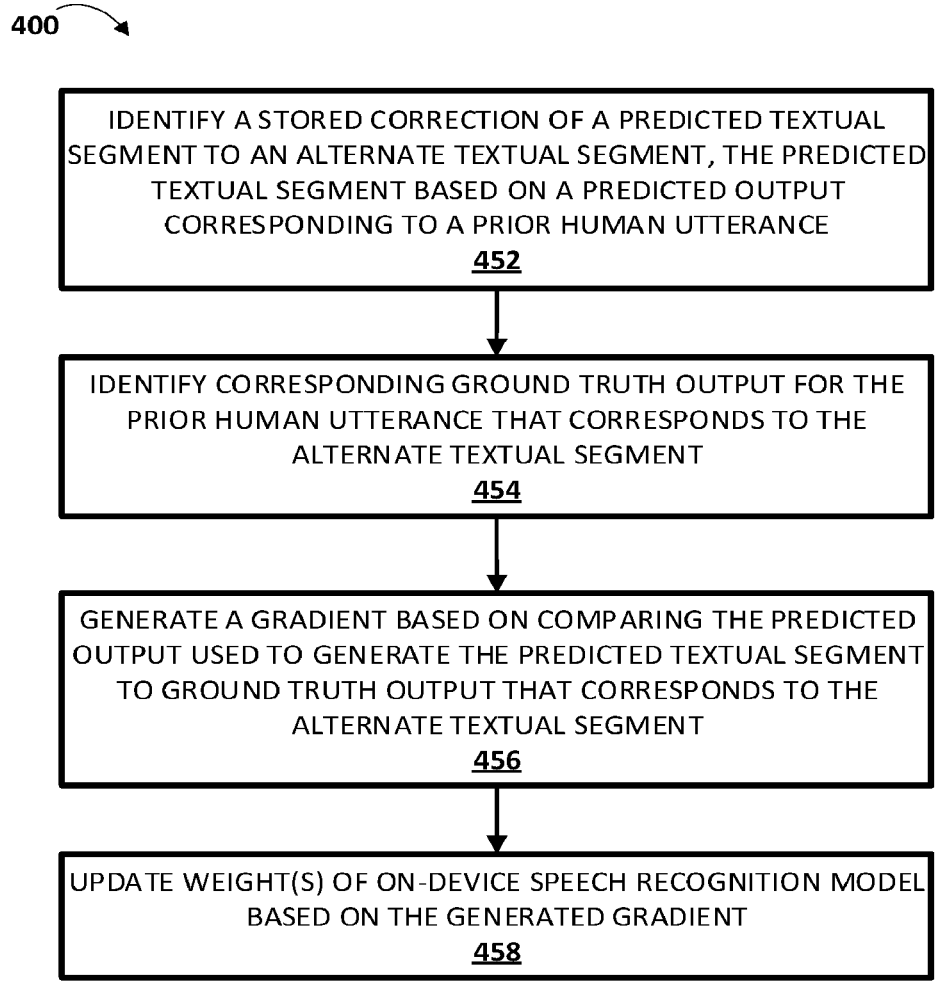
FIG. 4 depicts a flowchart illustrating an example method of generating a gradient, locally at a client device, and using the generated gradient to update weight(s) of an on-device speech recognition model.

FIG. 4 depicts a flowchart illustrating an example method 400 of generating a gradient, locally at a client device, and using the generated gradient to update weight(s) of an on-device speech recognition model. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 452, the system identifies a stored correction of a predicted textual segment to an alternate textual segment, where the predicted textual segment is generated using a predicted output that corresponds to a prior human utterance. Further, at least the predicted output for the stored correction can be retrieved from on-device storage (e.g., on-device storage 111).

At block 454, the system identifies a corresponding ground truth output for the prior human utterance that corresponds to the alternate textual segments. Further, the stored correction that is identified at block 452 can also be stored with an indication that the alternate textual segment corresponds to ground truth output for the predicted output used to generate the predicted textual segment identified at block 452.

At block 456, the system compares the predicted output used to generate the predicted textual segments to the alternate textual segments that corresponds to ground truth output. For example, the comparing can be based on comparing at least part of the predicted output used to generate the predicted textual segment to ground truth output that corresponds to the alternate textual segment. Also, for example, the comparing can be based on comparing the portion of the predicted textual segment that was corrected, to ground truth output that corresponds to the portion of the alternate textual segment that constitutes the correction. As yet another example, the on-device speech recognition model can instead be used to generate predicted output of a sequence of predicted phonemes that corresponds to the predicted textual segment, and generating the gradient can be based on comparing at least part of the predicted output used to generate the sequence of predicted phonemes to a ground truth sequence of phonemes that corresponds to the alternate textual segment.

At block 458, the system updates weight(s) of the on-device speech recognition model based on the gradient generated at block 456. It is noted that one or more iterations of method 400 can be performed at a given client device prior to performance of one or more iterations of method 200 (FIG. 2) on the given client device. Through performance of the method 400, the on-device speech recognition model is tailored in view of speech characteristics of a user of the given client device. This can result in on-device speech recognition that more accurately reflect the user's speech characteristics (e.g., tone, intonation, accent, and/or other speech characteristic(s)) and that is tailored in view of particular textual segments that are unique to the user and/or particular textual segments that occur frequently for the user, which can result in improved training of the on-device speech recognition model utilizing method 200.

FIGS. 5A-5E depict various user interfaces illustrating example user input for identifying corrections used in generating a gradient, locally at a client device 510, and transmitting the gradient and/or utilizing the generated gradient to update weight(s) of an on-device speech recognition model. The client device 510 of FIGS. 5A-5E includes a touch-sensitive display screen 540 that displays and/or streams (i.e., in real-time) predicted textual segments corresponding to spoken utterances provided by a user of the client device 510 according to implementations disclosed herein. For convenience, operations performed by the client device 540 are described with reference to an automated assistant (e.g., automated assistant 190 of FIG. 1B) that performs the operations.

The display screen 540 includes a textual reply and/or editing element 584 that allows a user to provide user input (e.g., touch input or typed input) for generating, modifying, deleting, and/or replacing term(s) of via a virtual keyboard. Further, the display screen 540 also includes a voice interface element 585 that, when activated, allows the user to provide user input (e.g., spoken input) for affirming an action being performed by the client device 510, cancelling an action being performed by the client device 510, and/or providing the spoken utterance or additional spoken utterances via one or more microphones. In some implementations, audio data corresponding to a spoken utterance can be captured via one or more of the microphones, a predicted textual segment can be generated and visually rendered on the display screen 540 of the client device 510, and user input correcting the predicted textual segment to an alternate textual segment can be touch input directed to the predicted textual segment(s) included in the textual reply and/or editing element 584 of the display screen 540 of the client device 510. In additional and/or alternative implementations, the user input correcting the predicted textual segment to the alternate textual segment can be spoken input. In some versions of these implementations, the spoken input is received in response touch input directed to the voice interface element 585, the spoken input is received within a threshold amount of time of the user input while the one or more microphones are activated without any touch input directed to the voice interface element 585, and/or other spoken input activation methods. Moreover, in some implementations, the display screen 540 also includes system interface elements 581, 582, 583 that may be interacted with by the user to cause the computing device 540 to perform one or more actions.

Moreover, in some implementations, a spoken utterance may include an action to be performed by the automated assistant using the client device 510. As some non-limiting examples, the action may be an action of calling or dialing a phone number, sending a text message, sending an SMS message, sending an email, looking up contact information, requesting navigational information, sending a calendar invitation, controlling one or more IoT device, and/or other actions capable of being performed by the automated assistant operating on the client device 510.

Figure 5A:
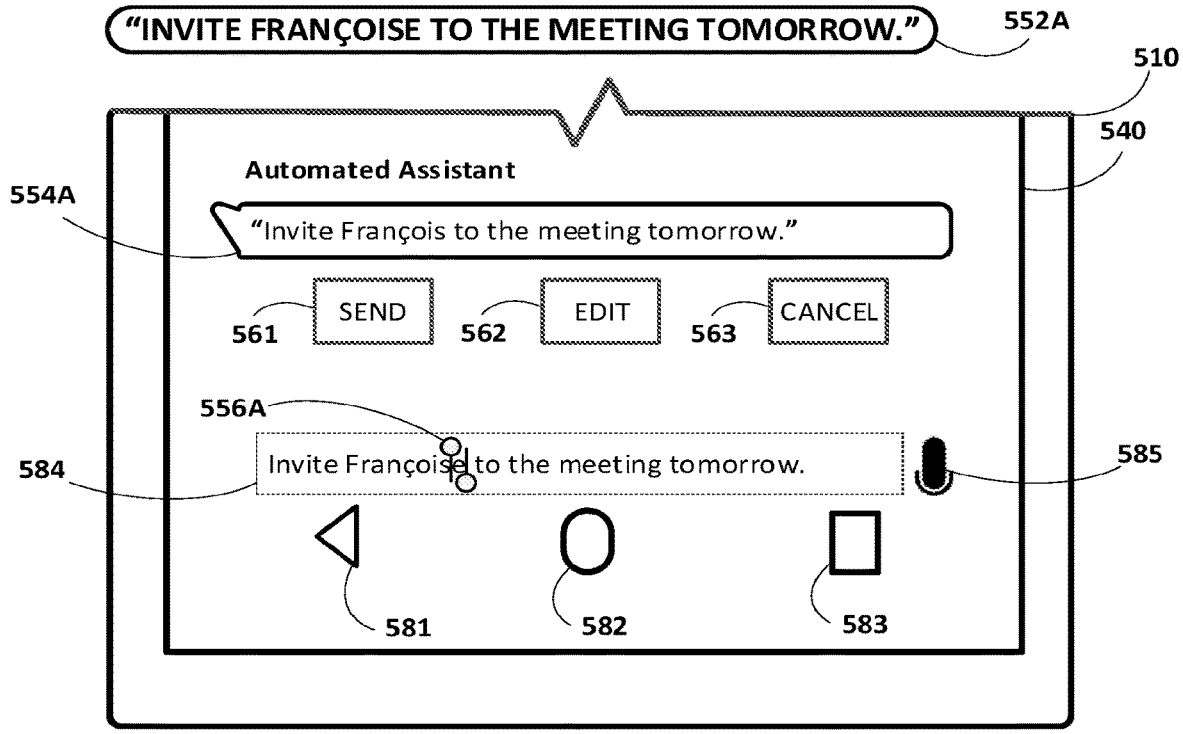
FIG. 5A, FIG. 5B, FIG. 5C, FIG. 5D, and FIG. 5E depict various user interfaces illustrating example user input for identifying corrections used in generating a gradient, locally at a client device, and transmitting the gradient and/or utilizing the generated gradient to update weight(s) of an on-device speech recognition model.

In FIG. 5A, the user provides the spoken utterance of "Invite Françoise to the meeting tomorrow" 552A, and an automated assistant visually renders a predicted textual segment "Invite François to the meeting tomorrow" 554A (e.g., generated based on a predicted output that is generated using on-device speech recognizer 122 of FIGS. 1A and 1B). Notably, the predicted textual segment does not include the "e" in "Françoise" as the user intended. Accordingly, the user can provide, for example, touch input that adds the "e" to "François", or deletes "François" and replaces it with "Françoise", thereby resulting an alternate textual segment "Invite Françoise to the meeting tomorrow". In some implementations, the textual reply and/or editing element 584 can be automatically populated with the predicted textual segment "Invite François to the meeting tomorrow" 554A for editing by the user, and the user input can be directed to the textual reply and/or editing element 584 to, for example, add the "e" to "François" as indicated by cursor identifiers 556A via touch input at the display screen 540. Moreover, in some additional or alternative implementations, the automated assistant can visually render a send graphical element 561, an edit graphical element 562, and/or a cancel graphical element 563. In some versions of those implementations, to populate the textual reply and/or editing element 584 with the predicted textual segment "Invite François to the meeting tomorrow" 554A, user input can be directed to the edit graphical element 562, thereby populating the textual reply and/or editing element 584 with the predicted textual segment and enabling the user to add the "e" to "François" as indicated by cursor identifiers 556A via touch input at the display screen 540. The resulting alternate textual segment "Invite Françoise to the meeting tomorrow" can be utilized in generating a gradient for updating an on-device speech recognition model.

Moreover, in some implementations, the correction of the predicted textual segment "Invite François to the meeting tomorrow" 554A to the alternate textual segment "Invite Françoise to the meeting tomorrow" will only be utilized in updating the speech recognition model if it is determined that the correction is directed to performance of the speech recognition model. Notably, the correction identified in FIG. 5A is directed to performance of on-device speech recognition (e.g., on-device speech recognition model 152 of FIGS. 1A and 1B). Determining the correction is directed to performance of the on-device speech recognition can be based on, for example, similarity between the predicted textual segment of "Invite François to the meeting tomorrow" 554B and the alternate textual segment of "Invite Françoise to the meeting tomorrow". The similarity between the textual segments can be determined using a similarity engine (e.g., similarity engine 130 of FIG. 1A). Based on a measure of similarity between the textual segments, it can be inferred that the correction of FIG. 1A is directed to on-device speech recognition, and the alternate textual segment "Invite Françoise to the meeting tomorrow" can be used in generating a gradient locally at the client device 510.

Figure 5B:
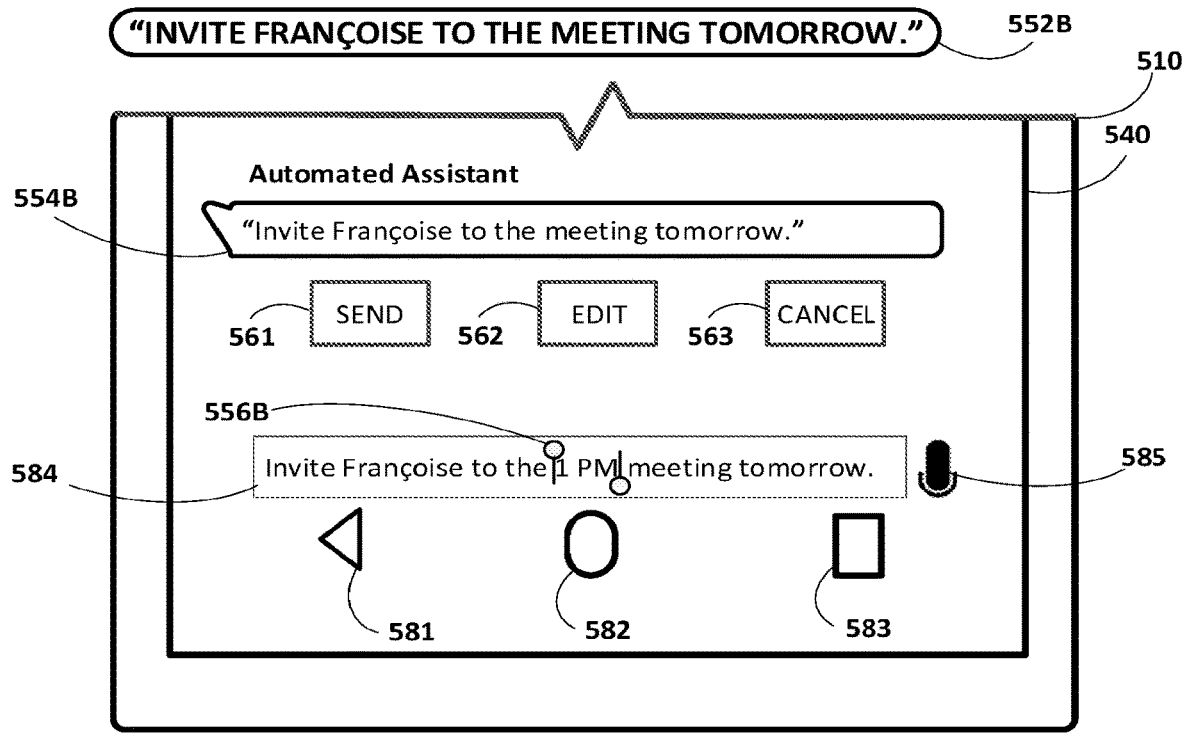

In contrast, in FIG. 5B, the user provides the same spoken utterance of "Invite Françoise to the meeting tomorrow" 552B. However, user input is provided that adds "1 PM" to the predicted textual segment(s) 554B as indicated by cursor identifiers 556B, thereby resulting in an alternate textual segment of "Invite Françoise to the 1 PM meeting tomorrow". Notably, the spoken utterance 552B did not include any temporal indication, and the user input adding "1 PM" may be added by the user for syntactic and/or semantic purposes (e.g., clarity, completeness, etc.). Determining the correction is syntactic and/or semantic in nature can also be based on, for example, textual similarity between the predicted textual segment "Invite Françoise to the meeting tomorrow" 554B and the alternate textual segment of "Invite Françoise to the 1 PM meeting tomorrow". The similarity between the textual segments can be determined using a similarity engine (e.g., similarity engine 130 of FIG. 1A). Based on a measure of similarity between the textual segments, as determined by the similarity engine, it can be inferred that the correction of FIG. 1B is semantic and/or syntactic in nature, and should not be used in generating a gradient locally at the client device 510.

Figure 5C:
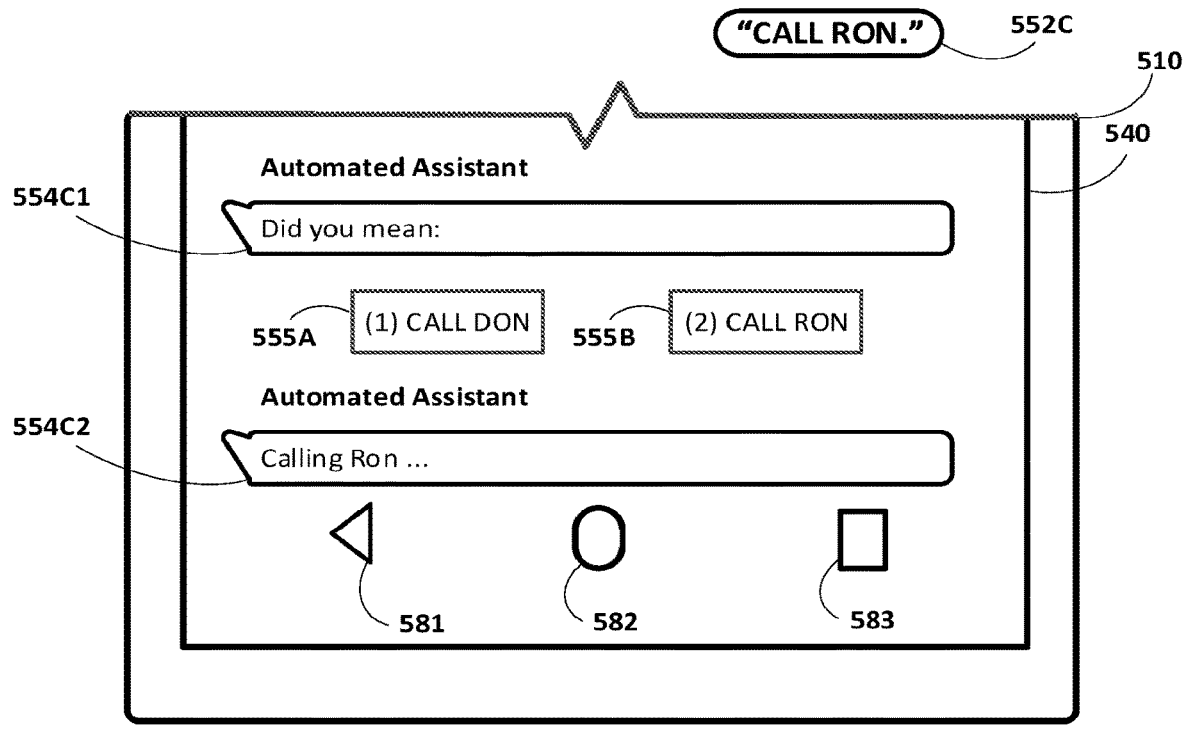

In FIG. 5C, the user provides the spoken utterance "Call Ron" 552C, and an automated assistant visually renders a prompt 554C1 for the user to select a correct textual segment from among multiple candidate predicted textual segment 555A, 555B (e.g., determined using on-device speech recognizer 122 of FIGS. 1A and 1B). Based on the spoken utterance "Call Ron" 552C in FIG. 5C, a primary predicted textual segment can be, for example, "(1) Call Don" 555A and an alternate candidate predicted textual segment can be, for example, "(2) Call Ron" 555B. In some implementations, determining to visually render a prompt for the user to select the correct textual segment from among the multiple candidate predicted textual segments can be based on, for example, confidence scores associated with each of the candidate predicted textual segments failing to meet a threshold confidence score, being within a threshold amount of one another and/or satisfying a threshold confidence score. For example, the automated assistant can process the spoken utterance "Call Ron" 552C to generate, using on-device speech recognition, the primary predicted textual segment "(1) Call Don" 555A, the alternate candidate predicted textual segment "(2) Call Ron" 555B, and confidence scores associated with each of the candidate textual segments. For example, if a confidence score for the primary textual segment (e.g., "(1) Call Don" 555A) is 0.85 and a confidence score for the alternate predicted textual segment (e.g., "(2) Call Ron" 555B) is 0.82, then a prompt for the user to select the correct textual segments can visually rendered based on the confidence scores being within a threshold amount of one another (e.g., 0.05, 0.10, and/or the confidence scores satisfying a threshold (e.g., 0.80, 0.75, 0.70). As another example, if a confidence score for the primary textual segment (e.g., "(1) Call Don" 555A) is 0.75 and a confidence score for the alternate predicted textual segment (e.g., "(2) Call Ron" 555B) is then a prompt for the user to select the correct textual segment can be visually rendered based on the confidence failing to satisfy a threshold confidence score (e.g., 0.80, 0.85).

In response to visually rendering the prompt "Did you mean:" 554C1 for the user to select the correct textual segment from among the primary predicted textual segment "(1) Call Don" 555A and the alternate predicted textual segment "(2) Call Ron" 555B, user input selecting the alternate predicted textual segment "(2) Call Ron" 555B as the correct textual segment can be received. In some implementations, the received user input is touch input (e.g., tapped, typed, etc.) that selects the alternate predicted textual segment "(2) Call Ron" 555B as corresponding to the spoken utterance 552C. In other implementations, the received user input is spoken input of "(2)" that selects the alternate predicted textual segment "(2) Call Ron" 555B as corresponding to the spoken utterance 552C. In some versions of the implementation, the voice interface element 585 and/or another voice activation element may need to be activated before the user can provide the spoken input. Based on the selection of the alternate predicted textual segment "(2) Call Ron" 555B as the correct textual segment, the alternate predicted text "Call Ron" can be utilized as ground truth output in generating a gradient locally at the client device 510.

Figure 5D:
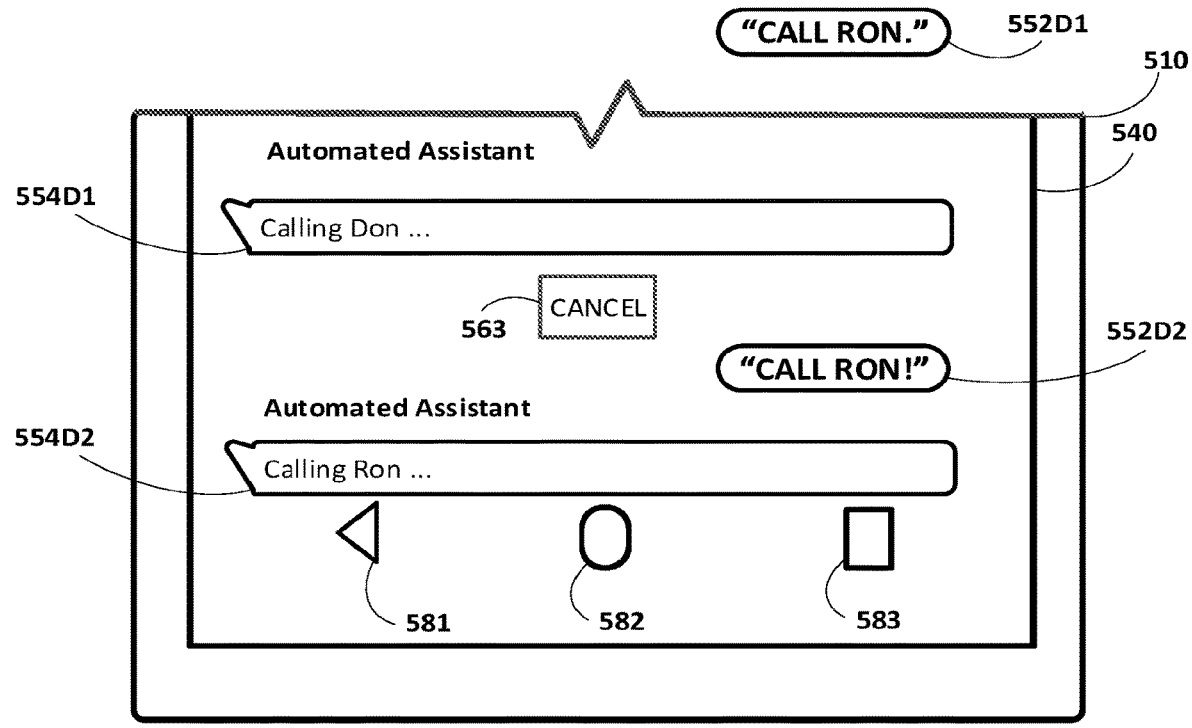
Figure 5E:
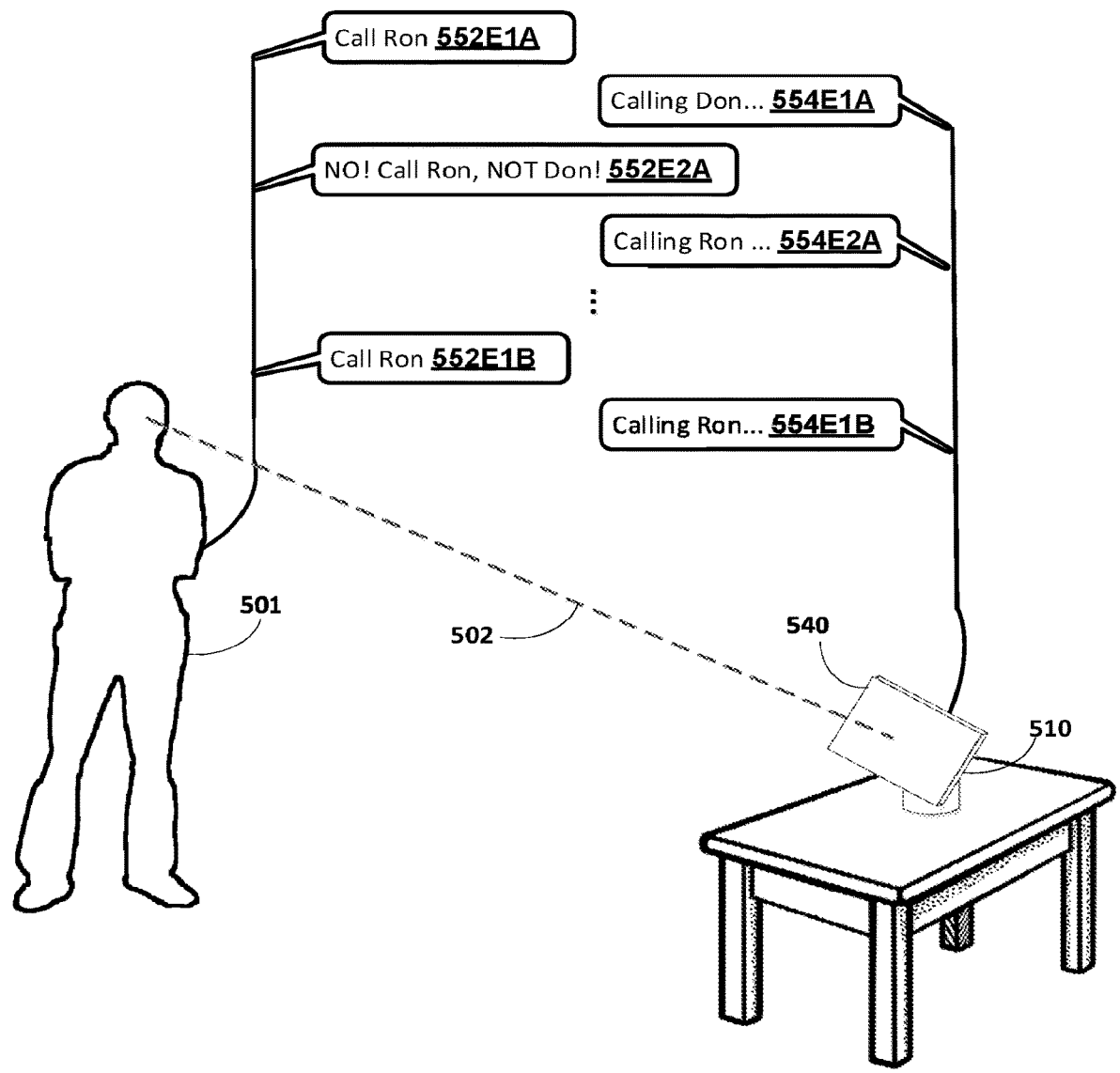

More particularly, FIGS. 5D and 5E are discussed in connection with a user providing a spoken utterance, the automated assistant initiating performance of an action based on predicted textual segments corresponding to the spoken utterance, and the user providing further user input that is an additional spoken utterance. In some implementations, determining to correct predicted textual segment(s) to alternate textual segment(s) in response to receiving the additional spoken utterance can be based on: temporal proximity of the additional spoken utterance to the spoken utterance (with closer temporal proximity being more indicative of intent as a correction); similarity between the additional spoken utterance and the spoken utterance (with more similarity being more indicative of intent as a correction); whether the additional spoken utterance cancelled an action to be taken based on the spoken utterance (with cancelling the action being more indicative of intent as a correction); and/or other factor(s), such as those described herein. In some versions of those implementations, the similarity between the spoken utterance and the additional spoken utterance can be determined based on acoustic similarity between the two utterances, edit distance or other similarity metric between predicted textual segment(s) for the two utterances, and/or overlap between predicted candidate textual segment(s) for the two utterances.

In FIG. 5D, the user provides the spoken utterance "Call Ron" 552D1, and an automated assistant initiates performance of the action "Calling Don . . . " 554D1 based on the predicted textual segment "Call Don", as opposed to an alternate predicted textual segment of "Call Ron". Prior to, or during performance of, the action "Calling Don . . . " 554D1, the automated assistant can be interrupted by user input. In some implementations, the user input that interrupts performance of the action "Calling Don . . . " 554D1 is touch input directed to the cancel graphical element 563. In some further versions of those implementations, an additional spoken utterance "Call Ron!" 552D2 is received that repeats the repeats the spoken utterance "Call Ron" 552D1. Based on the user input directed to the cancel graphical element 563 and/or the additional spoken utterance that repeats at least a portion of the spoken utterance 552D2, the automated assistant can infer that the action "Calling Don . . . " 554D1 is incorrect. Moreover, in some implementations, the automated assistant may consider the temporal proximity of the spoken utterance "Call Ron" 552D1 and the additional spoken utterance "Call Ron!" 552D2. For example, if the additional spoken utterance is received within, for example, 0.5 seconds of the spoken utterance, this relatively short temporal proximity can be a strong indicator that the additional spoken utterance is a correction, as opposed to if the additional spoken utterance is received within, for example, 10 seconds of the spoken utterance. Based on determining the predicted textual segment of "Call Ron" is incorrect, based on determining similarity between the spoken utterance "Call Ron" 552D2 and the additional spoken utterance "Call Ron!" 552D2, and/or based on determining "Call Ron" is a candidate predicted textual segment of the additional spoken utterance, the automated assistant can identify a correction from the predicted textual segment "Call Don" to the alternate textual segment "Call Ron". Moreover, in response to the additional spoken utterance 552D2, the automated assistant can initiate performance of the action "Calling Ron . . . " 554D2 as originally intended by the user, and can also use the correction in generating a gradient locally at the client device 510.

In FIG. 5E, the user 501 provides the spoken utterance "Call Ron" 552E1A, and an automated assistant initiates performance of the action "Calling Don . . . " 554E1A based on the predicted textual segment "Call Don", as opposed to an alternate predicted textual segment of "Call Ron". Prior to, or during performance of, the action Calling Don . . . " 554E1A, the automated assistant can be interrupted by user input. As shown in FIG. 5E, the user input that interrupts performance of the action "Calling Don . . . " 554E1A is an additional spoken utterance "NO! Call Ron, NOT Don!" 552E2A that repeats the repeats at least a portion of the spoken utterance and also includes additional terms. Based on the additional spoken utterance that repeats at least a portion of the spoken utterance 552D2, the automated assistant can infer that the action "Calling Don . . . " 554D1 is incorrect. Moreover, in some implementations, and in addition to the user input explicitly cancelling the action of "Calling Don . . . " and the temporal proximity of the spoken utterances discussed in connection with FIG. 5D, determining the predicted textual segment of "Call Don" (on which the action "Calling Don . . . " 554E1A is based), determining the predicted textual segment of "Call Ron" is incorrect can be based on a state of the user. The state of the user can be determined using a sentiment classifier, and can be based on: textual features of the additional spoken utterance; acoustic features of the additional spoken utterance; a facial expression of the user detected by one or more camera(s) and/or other vision components of the client device; one or more gestures of the user detected by one or more camera(s) and/or other vision components of the client device; and/or other sentiment determinations. For example, in FIG. 5E, the state of the user 501 can be based on, for example, predicted textual segments included in the additional spoken utterance "NO! Call Ron, NOT Don!" 552E2A that negate the action being performed, such as "NO" and "NOT", exclamatory sentences being included in the user input 552E2A, such as "NO!" and "NOT Don!", and/or gestures or body language (e.g., hands on hips, crossed arms, glaring, and/or other behavioral determinations) of the user 501 as indicated by the line-of-sight 502 between the user 501 and the client device 540 (which can also visually render an indication of performance of the action "Calling Don . . . " 554E1A). Based on determining the predicted textual segment of "Call Ron" is incorrect, based on determining similarity between a portion of the spoken utterance "Call Ron" 552E1A and a portion of the additional spoken utterance "NO! Call Ron, NOT Don!" 552E2A, based on the state of the user, and/or based on determining "Call Ron" is a candidate predicted textual segment of the additional spoken utterance, the automated assistant can identify a correction from the predicted textual segment "Call Don" to the alternate textual segment "Call Ron". Moreover, in response to the additional spoken utterance 552E2A, the automated assistant can initiate performance of the action "Calling Ron . . . " 552E4A as originally intended by the user, and can also use the correction in generating a gradient locally at the client device 510.

As described herein, an on-device speech recognition model can be trained based on based on actual human utterances of a particular user (e.g., as shown in FIGS. 5A-5E), and adapted to: speech characteristics of the particular user (e.g., tone, intonation, accent, and/or other speech characteristic(s)); particular textual segments that are unique to the particular user; and/or particular textual segments that occur frequently for the particular user. This can result in improved on-device speech recognition performance that is tailored to those speech characteristics and particular textual segments that are more likely to be encountered in spoken utterances processed at the client device. For example, in FIG. 5E, the subsequent spoken utterance of "Call Ron" 552E1B can be received, and the automated assistant can initiate performance of the correct action "Calling Ron . . . " 554E1B in response to the subsequent spoken utterance 552E1B. This improvement and personalization of the on-device speech recognition model can be based at least in part on training the on-device speech recognition model and/or global speech recognition model using corrections generated at the client device.

It should be noted that the examples of FIGS. 5A-5E are disclosed herein for the illustrative purposes and are not meant to be limiting. Further, it should be understood that various other techniques are contemplated herein and can be utilized by a client device to identify corrections to predicted textual segment(s) for utilization in generating gradients to update one or more weights for an on-device speech recognition model.

Figure 6:
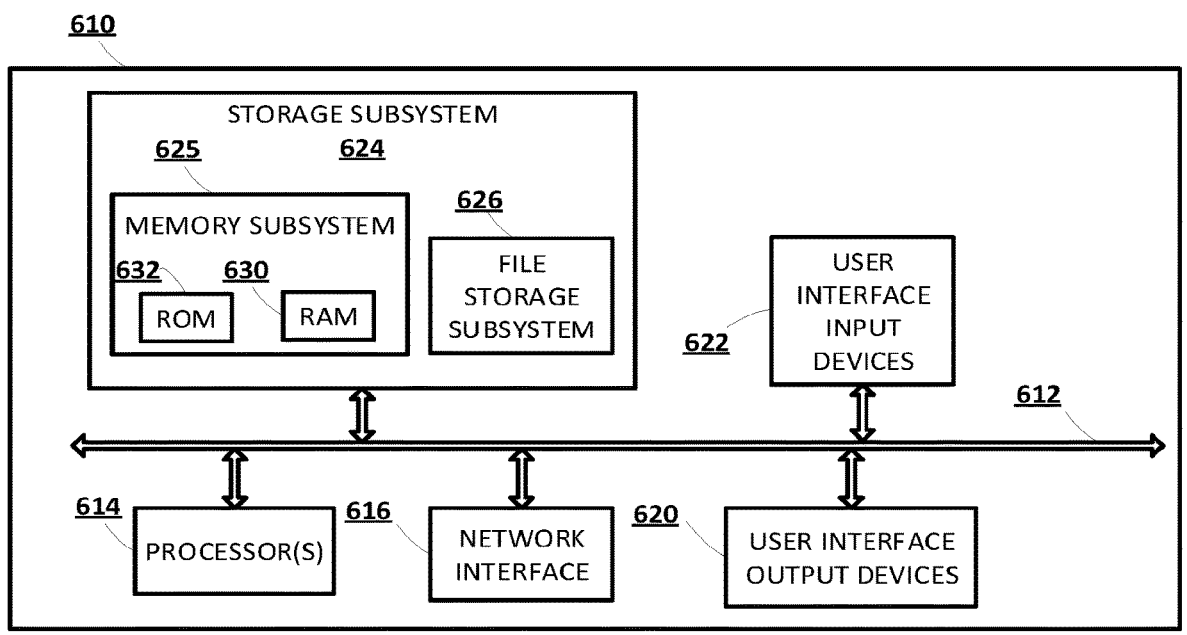
FIG. 6 depicts an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1A and 1B.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided herein. The method includes receiving, via one or more microphones of the client device, audio data that captures a spoken utterance of a user of the client device, and processing the audio data to generate a predicted textual segment that is a prediction of the spoken utterance. Processing the audio data to generate the predicted textual segment includes processing, using a speech recognition model stored locally at the client device, the audio data to generate a predicted output, and determining the predicted textual segment based on the predicted output. The method further includes causing at least part of the predicted textual segment to be visually rendered at a display of the client device, and receiving, responsive to the at least part of the predicted textual segment being visually rendered, further user interface input that is a correction of the predicted textual segment to an alternate textual segment. Responsive to the further user interface input being the correction of the predicted textual segment to the alternate textual segment, the method further includes generating a gradient based on comparing at least part of the predicted output to ground truth output that corresponds to the alternate textual segment, and updating one or more weights of the speech recognition model based on the generated gradient.

These and other implementations of the technology can include one or more of the following features.

In some implementations, the method further includes determining that the correction is directed to performance of the speech recognition model. Generating the gradient and updating the one or more weights is further responsive to determining that the correction is directed to performance of the speech recognition model.

In some versions of those implementations, the display is a touch-display, the further user interface input includes one or more touch inputs, directed at the display of the device, to modify a term of the predicted textual segment to create a modified term and/or to replace a term of the predicted textual segment with a replacement term, and the alternate textual segment includes the modified term or the replacement term. In some further versions of those implementations, determining that the correction is directed to performance of the speech recognition model includes determining a measure of similarity between the term of the predicted textual segment and the modified term or the replacement term of the alternate textual segment, and determining that the correction is directed to performance of the speech recognition model based on the measure of similarity satisfying a threshold. In yet further versions of those implementations, determining the measure of similarity between the term of the predicted textual segment and the modified term or the replacement term of the alternate textual segment includes determining an acoustic similarity between the term and the modified term or the replacement term, determining an edit distance similarity between the term and the modified term or the replacement term, and/or determining whether the modified term or the replacement term is a candidate term indicated by the predicted output, and determining the measure of similarity based on the acoustic similarity, the edit distance similarity, and/or whether the modified term or the replacement term is a candidate term indicated by the predicted output.

In some implementations, the method further includes determining the alternate textual segment is an alternate predicted textual segment based on the predicted output, and is in addition to the predicted textual segment, and causing at least part of the alternate predicted textual segment to be visually rendered, at the display of the client device, along with rendering of the predicted textual segment. The further user interface input includes a selection of the at least part of the alternate predicted textual segment in lieu of selection of the at least part of the predicted textual segment. In some versions of those implementations, causing the at least part of the alternate predicted textual segment to be visually rendered, at the display of the client device, along with rendering of the predicted textual segment is based on: a first confidence measure, for the predicted textual segment, determined based on the predicted output, and/or a second confidence measure, for the alternate predicted textual segment, determined based on the predicted output.

In some implementations, the further user interface input includes a further spoken utterance, of the user, that is captured in further audio data received via one or more of the microphones. In some versions of those implementations, the method further includes processing, using the speech recognition model stored locally at the client device, the further audio data to generate a further predicted output, determining, based on the further predicted output, that the alternate textual segment is a candidate prediction for the further spoken utterance, and determining that further user interface input is a correction of the predicted textual segment to the alternate textual segment based at least in part on: the alternate textual segment being a candidate prediction for the further spoken utterance; and determining that the further spoken utterance is a repeat of the spoken utterance.

In some further versions of those implementations, the method further includes determining, based on the predicted output, that the alternate textual segment is also a candidate prediction for the spoken utterance. Determining that the further spoken utterance is the repeat of the spoken utterance is based at least in part on determining that the alternate textual segment is a candidate prediction for both the spoken utterance and the additional spoken utterance. In some further versions of those implementations, determining that the further spoken utterance is the repeat of the spoken utterance is based on: acoustic similarity between the audio data and the further audio data, output similarity between the predicted output and the further predicted output, and/or a duration of time between the spoken utterance and the further spoken utterance.

In some implementations, the predicted output includes a sequence of predicted phonemes, and the ground truth output includes a ground truth sequence of phonemes that correspond to the alternate textual segment. In some implementations, the predicted output includes the predicted textual segment, and the ground truth output includes the alternate textual segment.

In some implementations, the method further includes transmitting, over a network to a remote system, the generated gradient without transmitting any of: the predicted textual segment, the audio data, and the alternate textual segment. The remote system utilizes the generated gradient, and additional gradients from additional client devices, to update global weights of a global speech recognition model. In some versions of those implementations, the updated global weights of the global speech recognition model are stored in memory of the remote system. In some versions of those implementations, the method further includes receiving, at the client device and from the remote system, the global speech recognition model. Receiving the global speech recognition model is subsequent to the remote system updating the global weights of the global speech recognition model based on the generated gradient and the additional gradients. Responsive to receiving the global speech recognition model, the method further includes replacing, in local storage of the client device, the speech recognition model with the global speech recognition model. In some versions of those implementations, the method further includes receiving, at the client device and from the remote system, the updated global weights. Receiving the updated global weights is subsequent to the remote system updating the global weights of the global speech recognition model based on the generated gradient and the additional gradients. Responsive to receiving the updated global weights, the method further includes replacing in local storage of the client device weights of the speech recognition model with the updated global weights.

In some implementations, the method further includes determining, based on sensor data from one or more sensors of the client device, that a current state of the client device satisfies one or more conditions. Generating the gradient, and/or updating the one or more weights are performed responsive to determining that the current state of the client device satisfies the one or more conditions. In some versions of those implementations, the one or more conditions include at least one of: the client device is charging, the client device has at least a threshold state of charge, or the client device is not being carried by a user.

In some implementations, a method performed by one or more processors of a client device is provided herein. The method includes receiving, via one or more microphones of the client device, audio data that captures a spoken utterance of a user of the client device, and processing the audio data to generate a predicted textual segment that is a prediction of the spoken utterance. Processing the audio data to generate the predicted textual segment includes processing, using a speech recognition model stored locally at the client device, the audio data to generate a predicted output, and determining the predicted textual segment based on the predicted output. The method further includes causing at least part of the predicted textual segment to be visually rendered at a display of the client device, and receiving, responsive to the at least part of the predicted textual segment being visually rendered, further user interface input that is a correction of the predicted textual segment to an alternate textual segment. Responsive to the further user interface input being the correction of the predicted textual segment to the alternate textual segment, the method further includes generating a gradient based on comparing at least part of the predicted output to ground truth output that corresponds to the alternate textual segment, and transmitting, over a network to a remote system, the generated gradient without transmitting any of: the predicted textual segment, the audio data, and the alternate textual segment. The remote system utilizes the generated gradient, and additional gradients from additional client devices, to update global weights of a global speech recognition model.

These and other implementations of the technology can include one or more of the following features.

In some implementations, the updated global weights of the global speech recognition model are stored in memory of the remote system.

In some implementations, the method further includes receiving, at the client device and from the remote system, the global speech recognition model. Receiving the global speech recognition model is subsequent to the remote system updating the global weights of the global speech recognition model based on the generated gradient and the additional gradients. Responsive to receiving the global speech recognition model, the method further includes replacing, in local storage of the client device, the speech recognition model with the global speech recognition model.

In some implementations, the method further includes receiving, at the client device and from the remote system, the updated global weights. Receiving the updated global weights is subsequent to the remote system updating the global weights of the global end-to-end speech recognition model based on the gradient and the additional gradients. Responsive to receiving the updated global weights, the method further includes replacing in local storage of the client device weights of the speech recognition model with the updated global weights.

In some implementations, the method further includes determining, based on sensor data from one or more sensors of the client device, that a current state of the client device satisfies one or more conditions. Generating the gradient, and/or updating the one or more weights are performed responsive to determining that the current state of the client device satisfies the one or more conditions.

In some implementations, the method further includes determining that the correction is directed to performance of the speech recognition model. Generating the gradient and updating the one or more weights is further responsive to determining that the correction is directed to performance of the speech recognition model.

In some implementations, determining that the correction is directed to performance of the speech recognition model further includes determining a measure of similarity between the term of the predicted textual segment and the modified term or the replacement term of the alternate textual segment, and determining that the correction is directed to performance of the speech recognition model based on the measure of similarity satisfying a threshold.

In some implementations, the method further includes determining the alternate predicted textual segment is an alternate predicted textual segment based on the predicted output, and is in addition to the predicted textual segment, and causing at least part of the alternate predicted textual segment to be visually rendered, at the display of the client device, along with rendering of the predicted textual segment. The further user interface input includes a selection of the at least part of the alternate predicted textual segment in lieu of selection of the at least part of the predicted textual segment.

What is claimed is:

1. A method performed by one or more processors of a client device, the method comprising:
   receiving, via one or more microphones of the client device, audio data that captures a spoken utterance of a user of the client device;
   processing, using a speech recognition model that is stored locally at the client device, the audio data to determine a predicted textual segment that is a prediction of the spoken utterance;

causing at least part of the predicted textual segment to be visually rendered at a display of the client device;

subsequent to the predicted textual segment being visually rendered:

receiving, via one or more of the microphones of the client device, additional audio data that captures an additional spoken utterance of the user; and processing, using the speech recognition model that is stored locally at the client device, the additional audio data to determine an alternate textual segment, the alternate textual segment being a correction to the predicted textual segment;

determining whether the alternate textual segment that is the correction to the predicted textual segment is directed to performance of the speech recognition model that is stored locally at the client device, wherein determining whether the alternate textual segment that is the correction to the predicted textual segment is directed to performance of the speech recognition model that is stored locally at the client device comprises:

determining a measure of similarity between the predicted textual segment and the alternate textual segment; and determining that the correction is directed to performance of the speech recognition model that is stored locally at the client device based on the measure of similarity satisfying a threshold; and in response to determining that the alternate textual segment that is the correction to the predicted textual segment is directed to performance of the speech recognition model that is stored locally at the client device:

generating a gradient based on comparing at least the predicted textual segment to the alternate textual segment, and updating one or more weights of the speech recognition model based on the generated gradient.

2. The method of claim 1, wherein determining the measure of similarity between the predicted textual segment and the alternate textual segment comprises:

determining an acoustic similarity between the predicted textual segment and the alternate textual segment.

3. The method of claim 1, wherein determining the measure of similarity between the predicted textual segment and the alternate textual segment comprises:

determining that the alternate textual segment predicted textual segment was considered for the prediction of the spoken utterance.

4. The method of claim 1, wherein processing the audio data to determine the predicted textual segment that is the prediction of the spoken utterance comprises:

processing, using the speech recognition model that is stored locally at the client device, the audio data to generate predicted output; and determining the predicted textual segment based on the predicted output.

5. The method of claim 4, wherein processing the additional audio data to determine the alternate textual segment comprises:

processing, using the speech recognition model that is stored locally at the client device, the audio data to generate additional predicted output; and determining the alternate textual segment based on the additional predicted output.

6. The method of claim 5, further comprising:

determining the alternate textual segment is the correction to the predicted textual segment based on one or more additional terms or phrases that are included in the additional spoken utterance.

7. The method of claim 1, further comprising:

in response to determining that the alternate textual segment that is the correction to the predicted textual segment is not directed to performance of the speech recognition model that is stored locally at the client device:

refraining from generating the gradient.

8. The method of claim 1, further comprising:

prior to receiving the audio data that captures the spoken utterance of the user:

receiving, at the client device and from a remote system, a global speech recognition model, the global speech recognition model including global weights; and storing, in local storage of the client device, the global speech recognition model to be utilized the speech recognition model that is stored locally at the client device.

9. The method of claim 8, further comprising:

transmitting, over a network to a remote system, the generated gradient without transmitting any of: the audio data, the predicted textual segment, the additional audio data, and the alternate textual segment, wherein the remote system utilizes the generated gradient, and additional gradients from additional client devices, to update the global weights of the global speech recognition model.

10. The method of claim 9, further comprising:

receiving, at the client device and from the remote system, an updated global speech recognition model, wherein receiving the updated global speech recognition model is subsequent to the remote system updating the global weights of the global speech recognition model based on the generated gradient and the additional gradients; and replacing, in the local storage of the client device, the global speech recognition model with the updated global speech recognition model to be utilized the speech recognition model that is stored locally at the client device.

11. The method of claim 9, further comprising:

receiving, at the client device and from the remote system, updated global weights of an updated global speech recognition model, wherein receiving the updated global weights of the updated speech recognition model is subsequent to the remote system updating the global weights of the global speech recognition model based on the generated gradient and the additional gradients; and replacing, in the local storage of the client device, the global weights of the speech recognition model with the updated global weights of the updated speech recognition model to be utilized the speech recognition model that is stored locally at the client device.

12. The method of claim 1, further comprising:

determining, based on sensor data from one or more sensors of the client device, that a current state of the client device satisfies one or more conditions, wherein generating the gradient is performed responsive to determining that the current state of the client device satisfies the one or more conditions.

13. A method performed by one or more processors of a client device, the method comprising:
receiving, via one or more microphones of the client device, audio data that captures a spoken utterance of a user of the client device;
processing, using a speech recognition model that is stored locally at the client device, the audio data to determine a predicted textual segment that is a prediction of the spoken utterance;
causing at least part of the predicted textual segment to be visually rendered at a display of the client device;
subsequent to the predicted textual segment being visually rendered:
receiving, via one or more of the microphones of the client device, additional audio data that captures an additional spoken utterance of the user; and
processing, using the speech recognition model that is stored locally at the client device, the additional audio data to determine an alternate textual segment that corrects the predicted textual segment;
determining whether the alternate textual segment that is the correction to the predicted textual segment is directed to performance of the speech recognition model that is stored locally at the client device, wherein determining whether the alternate textual segment that is the correction to the predicted textual segment is directed to performance of the speech recognition model that is stored locally at the client device comprises:
determining a measure of similarity between the predicted textual segment and the alternate textual segment; and
determining that the correction is directed to performance of the speech recognition model that is stored locally at the client device based on the measure of similarity satisfying a threshold; and
in response to determining that the alternate textual segment that is the correction to the predicted textual segment is directed to performance of the speech recognition model that is stored locally at the client device:
generating a gradient based on comparing at least the predicted textual segment to the alternate textual segment, and
transmitting, over a network to a remote system, the generated gradient without transmitting any of: the audio data, the predicted textual segment, the additional audio data, and the alternate textual segment,
wherein the remote system utilizes the generated gradient, and additional gradients from additional client devices, to update global weights of a global speech recognition model.

14. The method of claim 13, further comprising:
updating one or more weights of the speech recognition model based on the generated gradient.

15. The method of claim 13, further comprising:
determining, based on sensor data from one or more sensors of the client device, that a current state of the client device satisfies one or more conditions,
wherein generating the gradient is performed responsive to determining that the current state of the client device satisfies the one or more conditions.

16. The method of claim 15, wherein transmitting the generated gradient is also performed responsive to determining that the current state of the client device satisfies the one or more conditions.

17. A client device, the client device comprising:
one or more processors; and
memory storing local instructions that, when executed, cause the one or more processors to be operable to:
receive, via one or more microphones of the client device, audio data that captures a spoken utterance of a user of the client device;
process, using a speech recognition model that is stored locally at the client device, the audio data to determine a predicted textual segment that is a prediction of the spoken utterance;
cause at least part of the predicted textual segment to be visually rendered at a display of the client device;
subsequent to the predicted textual segment being visually rendered:
receive, via one or more of the microphones of the client device, additional audio data that captures an additional spoken utterance of the user; and
process, using the speech recognition model that is stored locally at the client device, the additional audio data to determine an alternate textual segment that corrects the predicted textual segment;
determine whether the alternate textual segment that is the correction to the predicted textual segment is directed to performance of the speech recognition model that is stored locally at the client device, wherein the instructions to determine whether the alternate textual segment that is the correction to the predicted textual segment is directed to performance of the speech recognition model that is stored locally at the client device comprise instructions to:
determine a measure of similarity between the predicted textual segment and the alternate textual segment; and
determine that the correction is directed to performance of the speech recognition model that is stored locally at the client device based on the measure of similarity satisfying a threshold; and
in response to determining that the alternate textual segment that is the correction to the predicted textual segment is directed to performance of the speech recognition model that is stored locally at the client device:
generate a gradient based on comparing at least the predicted textual segment to the alternate textual segment, and
one or both of:
update one or more weights of the speech recognition model based on the generated gradient; or
transmit, over a network to a remote system, the generated gradient without transmitting any of: the audio data, the predicted textual segment, the additional audio data, and the alternate textual segment,
wherein the remote system utilizes the generated gradient, and additional gradients from additional client devices, to update global weights of a global speech recognition model.

18. The client device of claim 17, wherein the instructions to determine the measure of similarity between the predicted textual segment and the alternate textual segment comprise instructions to:
determine an acoustic similarity between the predicted textual segment and the alternate textual segment.

19. A method performed by one or more processors of a client device, the method comprising:

receiving, via one or more microphones of the client device, audio data that captures a spoken utterance of a user of the client device;

processing, using a speech recognition model that is stored locally at the client device, the audio data to determine a predicted textual segment that is a prediction of the spoken utterance;

causing at least part of the predicted textual segment to be visually rendered at a display of the client device;

subsequent to the predicted textual segment being visually rendered:

receiving, via one or more of the microphones of the client device, additional audio data that captures an additional spoken utterance of the user; and processing, using the speech recognition model that is stored locally at the client device, the additional audio data to determine an alternate textual segment, the alternate textual segment being a correction to the predicted textual segment;

determining whether the alternate textual segment that is the correction to the predicted textual segment is directed to performance of the speech recognition model that is stored locally at the client device;

in response to determining that the alternate textual segment that is the correction to the predicted textual segment is directed to performance of the speech recognition model that is stored locally at the client device:

generating a gradient based on comparing at least the predicted textual segment to the alternate textual segment, and one or both of:

updating one or more weights of the speech recognition model based on the generated gradient; or transmitting, over a network to a remote system, the generated gradient without transmitting any of: the audio data, the predicted textual segment, the additional audio data, and the alternate textual segment, wherein the remote system utilizes the generated gradient, and additional gradients from additional client devices, to update global weights of a global speech recognition model; and in response to determining that the alternate textual segment that is the correction to the predicted textual segment is not directed to performance of the speech recognition model that is stored locally at the client device:

refraining from generating the gradient.

20. A client device, the client device comprising:
one or more processors; and
memory storing local instructions that, when executed, cause the one or more processors to be operable to:

receive, via one or more microphones of the client device, audio data that captures a spoken utterance of a user of the client device;

process, using a speech recognition model that is stored locally at the client device, the audio data to determine a predicted textual segment that is a prediction of the spoken utterance;

cause at least part of the predicted textual segment to be visually rendered at a display of the client device;

subsequent to the predicted textual segment being visually rendered:

receive, via one or more of the microphones of the client device, additional audio data that captures an additional spoken utterance of the user; and process, using the speech recognition model that is stored locally at the client device, the additional audio data to determine an alternate textual segment that corrects the predicted textual segment;

determine whether the alternate textual segment that is the correction to the predicted textual segment is directed to performance of the speech recognition model that is stored locally at the client device;

in response to determining that the alternate textual segment that is the correction to the predicted textual segment is directed to performance of the speech recognition model that is stored locally at the client device:

generate a gradient based on comparing at least the predicted textual segment to the alternate textual segment, and one or both of:

update one or more weights of the speech recognition model based on the generated gradient; or transmit, over a network to a remote system, the generated gradient without transmitting any of: the audio data, the predicted textual segment, the additional audio data, and the alternate textual segment, wherein the remote system utilizes the generated gradient, and additional gradients from additional client devices, to update global weights of a global speech recognition model; and in response to determining that the alternate textual segment that is the correction to the predicted textual segment is not directed to performance of the speech recognition model that is stored locally at the client device:

refrain from generating the gradient.

* * * * *